(12) United States Patent
Pan

(10) Patent No.: US 11,825,333 B2
(45) Date of Patent: Nov. 21, 2023

(54) METHOD AND APPARATUS FOR SERVICING QOS (QUALITY OF SERVICE) FLOW IN A WIRELESS COMMUNICATION SYSTEM

(71) Applicant: ASUSTek Computer Inc., Taipei (TW)

(72) Inventor: Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/382,470

(22) Filed: Jul. 22, 2021

(65) Prior Publication Data

US 2021/0352521 A1 Nov. 11, 2021

Related U.S. Application Data

(63) Continuation of application No. 16/041,525, filed on Jul. 20, 2018, now Pat. No. 11,109,262.
(Continued)

(51) Int. Cl.
*H04W 28/02* (2009.01)
*H04L 47/24* (2022.01)
(Continued)

(52) U.S. Cl.
CPC ......... *H04W 28/0268* (2013.01); *H04L 47/24* (2013.01); *H04L 47/805* (2013.01);
(Continued)

(58) Field of Classification Search
CPC . H04W 28/0268; H04W 76/12; H04W 28/24; H04W 84/045; H04L 47/24; H04L 47/805
See application file for complete search history.

(56) References Cited

U.S. PATENT DOCUMENTS

2015/0016611 A1 1/2015 Wu
2016/0021592 A1 1/2016 Vesely et al.
(Continued)

FOREIGN PATENT DOCUMENTS

WO 2018026188 A1 2/2018
WO 2018030798 A1 2/2018

OTHER PUBLICATIONS

Corresponding Indian Patent Application No. 201814027101, Office Action dated Aug. 14, 2020. English Translation.
(Continued)

*Primary Examiner* — Michael Thier
*Assistant Examiner* — Nevena Zecevic Sandhu
(74) *Attorney, Agent, or Firm* — Cooper Legal Group LLC

(57) ABSTRACT

A method and apparatus are disclosed from the perspective of a network node. In one embodiment, the method includes the network node configuring a UE (User Equipment) with a first DRB (Data Radio Bearer), wherein the first DRB is configured with a presence of SDAP (Service Data Adaptation Control) header and the network node is not allowed to reconfigure the first DRB with an absence of SDAP header before the first DRB is released. The method further includes the network node configuring the UE to serve a first QoS (Quality of Service) flow and a second QoS flow by the first DRB. The method also includes re-configuring the UE to serve the first QoS flow by a second DRB, which was originally served by the first DRB, if the second QoS flow is released or removed from the first DRB, wherein the second DRB is configured with an absence of SDAP header.

20 Claims, 10 Drawing Sheets

Related U.S. Application Data

(60) Provisional application No. 62/534,808, filed on Jul. 20, 2017.

(51) Int. Cl.
  *H04L 47/80* (2022.01)
  *H04W 76/12* (2018.01)
  *H04W 84/04* (2009.01)
  *H04W 28/24* (2009.01)

(52) U.S. Cl.
  CPC ............ *H04W 76/12* (2018.02); *H04W 28/24* (2013.01); *H04W 84/045* (2013.01)

(56) References Cited

U.S. PATENT DOCUMENTS

| | | |
|---|---|---|
| 2018/0083688 A1 | 3/2018 | Agiwal et al. |
| 2018/0279160 A1 | 9/2018 | Sayenko et al. |
| 2018/0368167 A1 | 12/2018 | Kim et al. |
| 2020/0008118 A1 | 1/2020 | Sagawa et al. |
| 2020/0178113 A1 | 6/2020 | Jin et al. |
| 2020/0213894 A1 | 7/2020 | Agiwal et al. |
| 2021/0168882 A1* | 6/2021 | Chang .................. H04W 76/11 |

OTHER PUBLICATIONS

Ericsson, "Reflective QoS and Presence of Flow-ID", 3GPP TSG-RAN WG2 #98-AH, Tdoc R2-1704379, Document for Discussion, Qingdao, P.R. of China, Jun. 27-29, 2017.

LG Electronics Inc., "Configurability for UL QoS flow ID marking", 3GPP TSG-RAN WG2 NR ad hoc, R2-1706850, Agenda Item 10.3.4.4 (NR_newRAT-Core), Document for Discussion and Decision, Jun. 27-29, 2017, Qingdao, China.

LG Electronics Inc., "Configurability for UL QoS Flow ID Marking", 3GPP RAN WG2 #98, R2-1704469, Agenda: 10.4.4.3 (NR_newRAT-Core), Document for Discussion and Decision, May 15-19, 2017, Hangzhou, China.

3GPP TSG-RAN WG 2 Meeting AH, R2-1706787, Revision of R2-1706787, Qingdao, P.R. of China, Jun. 27-29, 2017, agenda item: 10.3.4.3, source: Huawei, HiSilicon, Title: Reflective QoS Flow to DRB Re-Mapping, document for: approval.

Corresponding Taiwan Patent Application No. 107125271, Office Action dated Jul. 2, 2019. English Translation.

CATT, "QoS re-mapping of QoS flow and DRB", 3GPP TSG-RAN WG2 Meeting #98, R2-1704266, Agenda 10.4.4.3, Document for Discussion and Decision, May 15-19, 2017, Hangzhou, China.

Corresponding Korean Patent Application No. 10-2018-0084686, Office Action dated Jul. 10, 2019. English Translation.

Corresponding European Patent Application No. 18184650.2, Extended Search Report dated Nov. 22, 2018.

ETSI, Evolved Universal Terrestrial Radio Access (E-UTRA); Radio Resource Control (RRC); Protocol Specification; 3GPP TS 36.331, Ver. 14.3.0, Rel. 14, Oct. 2017.

Corresponding Japanese Patent Application No. 2018-136287, Office Action dated May 21, 2019. English Translation.

\* cited by examiner

METHOD AND APPARATUS FOR SERVICING QOS (QUALITY OF SERVICE) FLOW IN A WIRELESS COMMUNICATION SYSTEM

CROSS-REFERENCE TO RELATED APPLICATIONS

The present application claims priority to and is a continuation of U.S. application Ser. No. 16/041,525, filed on Jul. 20, 2018, entitled "METHOD AND APPARATUS FOR SERVICING QOS (QUALITY OF SERVICE) FLOW IN A WIRELESS COMMUNICATION SYSTEM", the entire disclosure of which is incorporated herein in its entirety by reference. U.S. application Ser. No. 16/041,525 claims the benefit of U.S. Provisional Patent Application Ser. No. 62/534,808 filed on Jul. 20, 2017, the entire disclosure of which is incorporated herein in its entirety by reference.

FIELD

This disclosure generally relates to wireless communication networks, and more particularly, to a method and apparatus for improving scheduling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network node. In one embodiment, the method includes the network node configuring a UE (User Equipment) with a first DRB (Data Radio Bearer), wherein the first DRB is configured with a presence of SDAP (Service Data Adaptation Control) header and the network node is not allowed to reconfigure the first DRB with an absence of SDAP header before the first DRB is released. The method further includes the network node configuring the UE to serve a first QoS (Quality of Service) flow and a second QoS flow by the first DRB. The method also includes re-configuring the UE to serve the first QoS flow by a second DRB, which was originally served by the first DRB, if the second QoS flow is released or removed from the first DRB, wherein the second DRB is configured with an absence of SDAP header.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V0.4.1, "NR; NR and NG-RAN Overall Description"; TS 23.501 V1.0.0, "System Architecture for the 5G System; Stage 2"; R2-1707159, "SDAP Header Format"; R2-1707160, "Reflective QoS and Presence of Flow-ID"; R2-1707161, "QoS Flow Remapping Within the Same Cell and in Handover"; S2-170065, "Discussion on Reflective QoS activation using C-plane and U-plane"; RAN2 #98 meeting chairman's note; RAN2 NR Ad Hoc #2 meeting chairman's note; TS 38.323 V0.0.5, "NR; Packet Data Convergence Protocol (PDCP) specification"; and TS 36.331 V14.0.0, "E-UTRA; Radio Resource Control (RRC) Protocol specification". The standards and documents listed above are hereby expressly incorporated by reference in their entirety.

Figure 1:
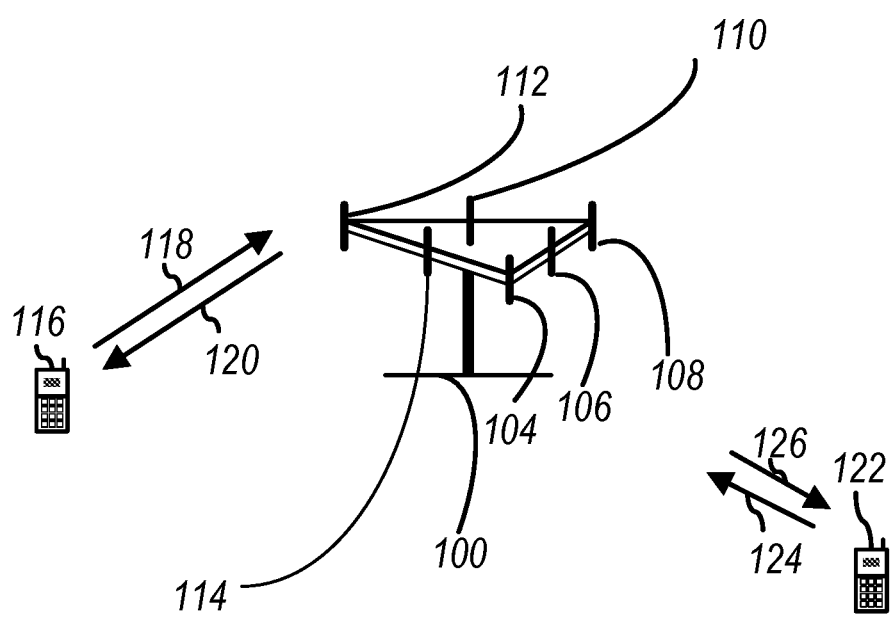
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
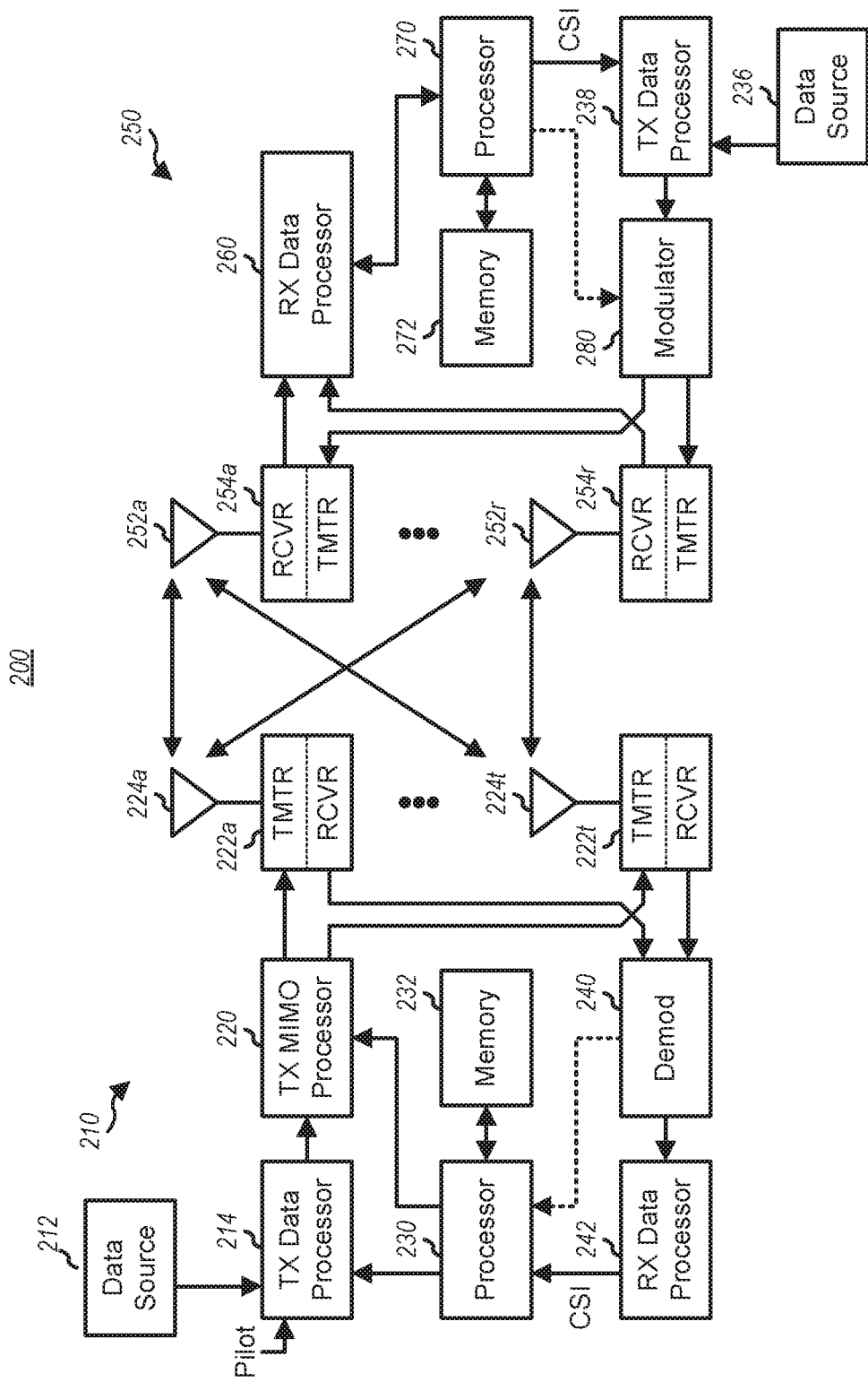
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
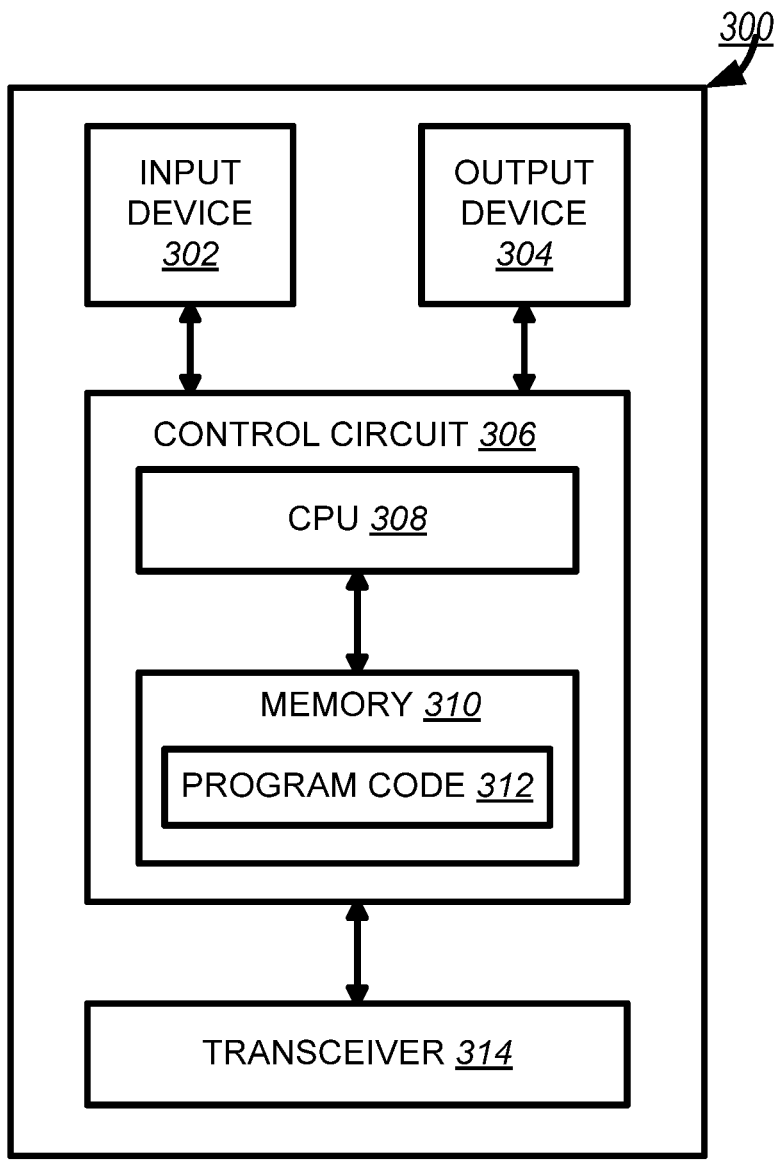
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
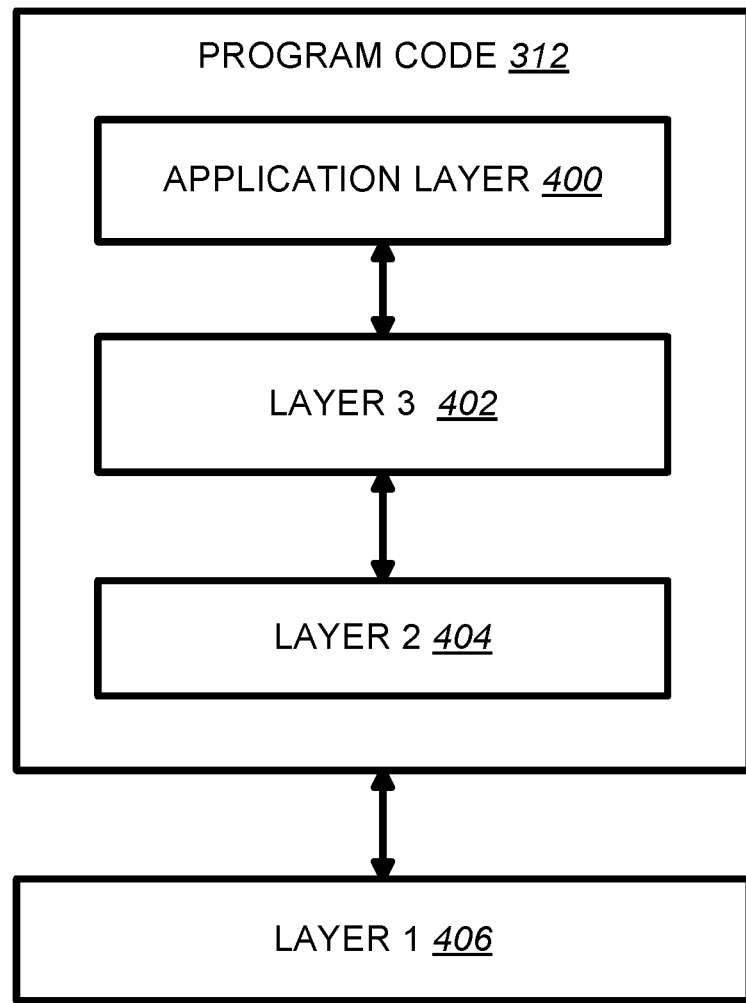
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion

406. The Layer 3 portion 402 generally performs radio resource control. The Layer 2 portion 404 generally performs link control. The Layer 1 portion 406 generally performs physical connections.

3GPP TS 38.300 described the Service Data Adaption Protocol (SDAP) layer and QoS (Quality of Service) as follows:

6.5 SDAP Sublayer

The main services and functions of SDAP include:
  Mapping between a QoS flow and a data radio bearer;
  Marking QoS flow ID (QFI) in both DL and UL packets.

A single protocol entity of SDAP is configured for each individual PDU session, except for DC where two entities can be configured (one for MCG and another one for SCG—see subclause 12).

[ . . . ]

12 QoS

The QoS architecture in NG-RAN is depicted in the FIG. 13-1 and described in the following:
  For each UE, 5GC establishes one or more PDU Sessions.
  For each UE, the NG-RAN establishes one or more Data Radio Bearers (DRB) per PDU Session. The NG-NG-RAN maps packets belonging to different PDU sessions to different DRBs. Hence, the NG-RAN establishes at least one default DRB for each PDU Session indicated by 5GC upon PDU Session establishment.
  NAS level packet filters in the UE and in the 5GC associate UL and DL packets with QoS Flows.
  AS-level mapping in the UE and in the NG-RAN associate UL and DL QoS Flows with DRBs.

[FIG. 12-1 of 3GPP TS 38.300 V0.4.1, entitled "QoS architecture", is omitted]

NG-RAN and 5GC ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum).

In NG-RAN, the data radio bearer (DRB) defines the packet treatment on the radio interface (Uu). A DRB serves packets with the same packet forwarding treatment. Separate DRBs may be established for QoS flows requiring different packet forwarding treatment. In the downlink, the NG-RAN maps QoS Flows to DRBs based on NG-U marking (QoS Flow ID) and the associated QoS profiles. In the uplink, the UE marks uplink packets over Uu with the QFI for the purposes of marking forwarded packets to the CN.

In the uplink, the NG-RAN may control the mapping of QoS Flows to DRB in two different ways:
  Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

It is FFS whether the marking with a QFI can be semi-statically configured (to not include the QOS flow ID when not needed).

Explicit Configuration: besides the reflective mapping, the NG-RAN may configure by RRC an uplink "QoS Flow to DRB mapping".

The precedence of the RRC configured mapping and reflective QoS is FFS (can reflective QoS update and thereby override an RRC configured mapping? Or does a configured QoS Flow ID to DRB mapping always take precedence over a reflective mapping?)

If an incoming UL packet matches neither an RRC configured nor a reflective "QoS Flow ID to DRB mapping", the UE shall map that packet to the default DRB of the PDU session.

Within each PDU session, is up to NG-RAN how to map multiple QoS flows to a DRB. The NG-RAN may map a GBR flow and a non-GBR flow, or more than one GBR flow to the same DRB, but mechanisms to optimise these cases are not within the scope of standardization. The timing of establishing non-default DRB(s) between NG-RAN and UE for QoS flow configured during establishing a PDU session can be different from the time when the PDU session is established. It is up to NG-RAN when non-default DRBs are established.

In DC, the QoS flows belonging to the same PDU session can be mapped to different bearer types (see subclause 4.5.2) and as a result there can be two different SDAP entities configured for the same PDU session: one for MCG and another one for SCG (for instance when one MCG bearer and one SCG bearer are used for two different QoS flows). The support for PDU session mapped to different bearers is pending conclusions in SA2 and RAN3.

3GPP TS 23.501 specified QoS model for NR (New RAT/Radio) as follows:

5.7 QoS model 5.7.1 General Overview

The 5G QoS model supports a QoS flow based framework. The 5G QoS model supports both QoS flows that require guaranteed flow bit rate and QoS flows that do not require guaranteed flow bit rate. The 5G QoS model also supports reflective QoS (see clause 5.7.5).

The QoS flow is the finest granularity of QoS differentiation in the PDU session. A QoS Flow ID (QFI) is used to identify a QoS flow in the 5G system. User Plane traffic with the same QFI within a PDU session receives the same traffic forwarding treatment (e.g. scheduling, admission threshold). The QFI is carried in an encapsulation header on N3 (and N9) i.e. without any changes to the e2e packet header. It can be applied to PDUs with different types of payload, i.e. IP packets, unstructured PDUs and Ethernet frames. The QFI shall be unique within a PDU session.

NOTE 1: Policing of User Plane traffic (e.g. MFBR enforcement) is not regarded as QoS differentiation and is done by UPFs on an SDF level granularity.

Each QoS flow (GBR and Non-GBR) is associated with the following QoS parameters (parameter details are described in clause 5.7.2):
  5G QoS Indicator (5QI).
  Allocation and Retention Priority (ARP).

Each GBR QoS flow is in addition associated with the following QoS parameters (details are described in clause 5.7.2):
  Guaranteed Flow Bit Rate (GFBR)—UL and DL;
  Maximum Flow Bit Rate (MFBR)—UL and DL;
  Notification control.

Each Non-GBR QoS flow may in addition be associated with the following QoS parameter (details are described in clause 5.7.2):
  Reflective QoS Attribute (RQA).

Two ways to control QoS flows are supported:
  1) For non-GBR QoS flows with standardized 5QIs, the 5QI value is used as QFI as defined in clause 5.7.4 and a default ARP is used. In this case no additional N2 signalling is required at the time traffic for the corresponding QoS flows start; or
  2) For GBR and non-GBR QoS flows, all the necessary QoS Parameters corresponding to a QFI are sent as QoS profile to (R)AN, UPF either at PDU Session establishment or QoS flow establishment/modification.

Editor's note: Whether beyond the standardized 5QIs, also pre-configured 501 values can be further used as QFI values is FFS.

The QoS parameters of a QoS flow are provided to the (R)AN as a QoS profile over N2 at PDU Session or at QoS flow establishment and when NG-RAN is used at every time the User Plane is activated. QoS parameters may also be pre-configured in the (R)AN for non-GBR QoS flows (i.e. without the need to be signalled over N2).

The UE performs the classification and marking of UL User plane traffic, i.e. the association of uplink traffic to QoS flows, based on QoS rules. These rules may be explicitly signaled over N1 (at PDU Session establishment or QoS flow establishment), pre-configured in the UE or implicitly derived by UE from reflective QoS. A QoS rule contains a QoS rule identifier, the QFI of the QoS flow, one or more packet filters and a precedence value. There can be more than one QoS rule associated with the same QFI (i.e. with the same QoS flow).

A default QoS rule is required for every PDU session. The default QoS rule is the only QoS rule of a PDU session that may contain no packet filter (in this case, the highest precedence value (i.e. lowest priority) has to be used). If the default QoS rule does not contain a packet filter, the default QoS rule defines the treatment of packets that do not match any other QoS rule in a PDU session.

Editor's note: It is FFS whether there, in addition, is a need for pre-authorized QoS rules be provided to the UE.

The SMF allocates the QFI for every QoS flow and derives its QoS parameters from the information provided by the PCF. When applicable, the SMF provides the QFI together with the QoS profile containing the QoS parameters of a QoS flow to the (R)AN. The SMF provides the SDF template (i.e. the set of packet filters associated with the SDF received from the PCF) together with the SDF precedence and the corresponding QFI to the UPF enabling classification and marking of User Plane traffic. When applicable, the SMF generates the QoS rule(s) for the PDU Session by allocating QoS rule identifiers, adding the QFI of the QoS flow, setting the packet filter(s) to the UL part of the SDF template and setting the QoS rule precedence to the SDF precedence. The QoS rules are then provided to the UE enabling classification and marking of UL User Plane traffic.

Editor's note: Some applications, e.g. IMS, require also the DL part of the SDF template in the QoS rule. Whether the DL of the SDF template has to be sent for every QoS rule is FFS.

Figure 5:
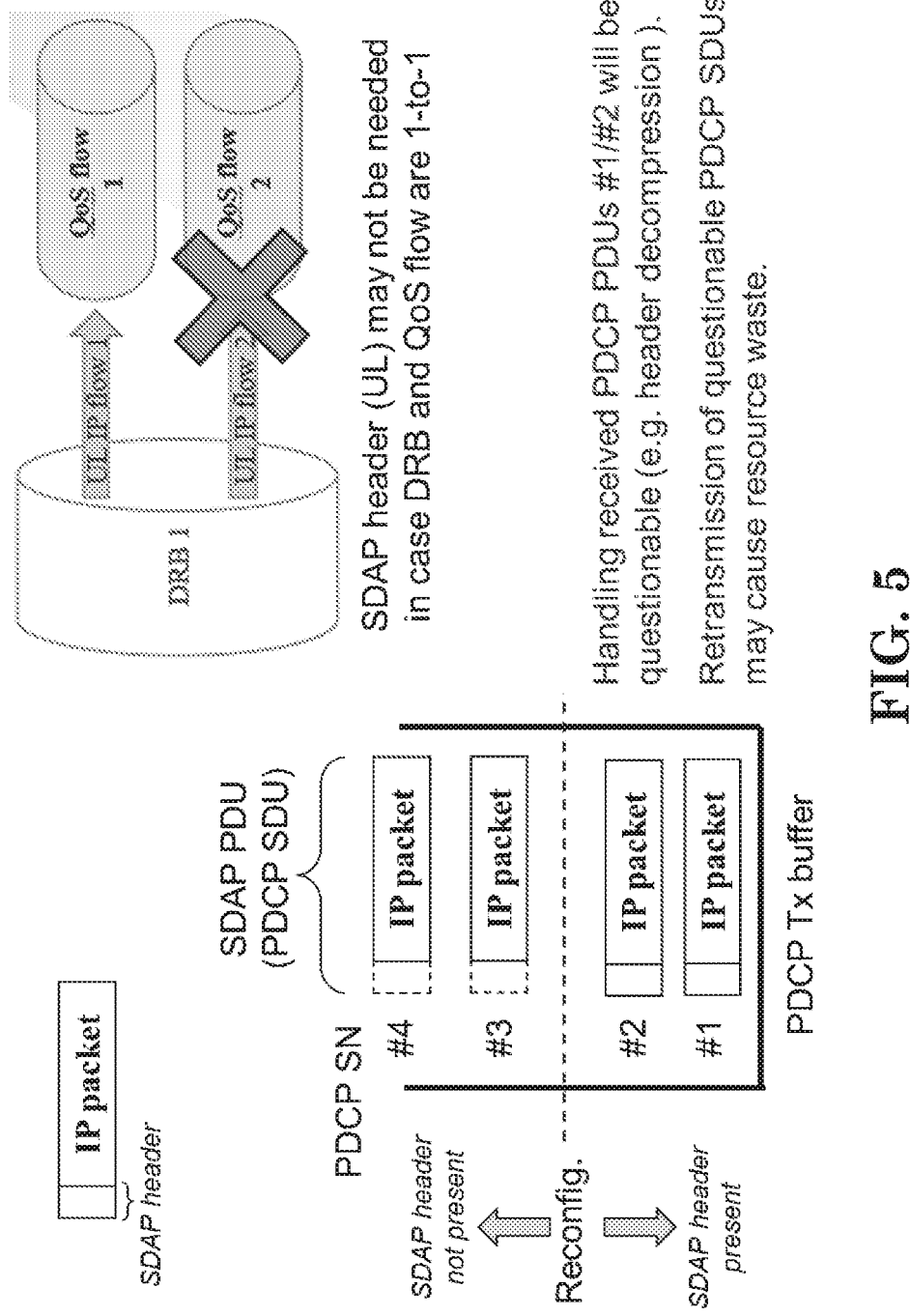
FIG. 5 is a diagram according to one exemplary embodiment.

The principle for classification and marking of User Plane traffic and mapping of QoS Flows to AN resources is illustrated in FIG. 5.7.1-1.

[FIG. 5.7.1-1 of 3GPP TS 23.501 V1.0.0, entitled "The principle for classification and User Plane marking for QoS Flows and mapping to AN Resources", is omitted]

In DL incoming data packets are classified based on SDF templates according to their SDF precedence (without initiating additional N4 signalling). The CN conveys the classification of the User Plane traffic belonging to a QoS flow through an N3 (and N9) User Plane marking using a QFI. The AN binds QoS flows to AN resources (i.e. Data Radio Bearers in case of in case of 3GPP RAN). There is no strict 1:1 relation between QoS flows and AN resources. It is up to the AN to establish the necessary AN resources to map the QoS flows to DRBs so that the UE receives the QFI (and reflective QoS (see clause 5.7.5) may be applied).

In UL, the UE evaluates UL packets against the packet filters in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS Flow. The UE then binds QoS flows to AN resources.

If no match is found and the default QoS rule contains one or more uplink packet filters, the UE shall discard the uplink data packet.

The following characteristics apply for processing of Downlink traffic:
- UPF maps User Plane traffic to QoS flows based on the SDF templates
- UPF performs Session-AMBR enforcement and also performs PDU counting for support of charging.
- UPF transmits the PDUs of the PDU session in a single tunnel between 5GC and (R)AN, the UPF includes the QFI in the encapsulation header. In addition, UPF may include an indication for reflective QoS activation in the encapsulation header.
- UPF performs transport level packet marking in downlink, e.g. setting the DiffServ Code point in outer IP header. Transport level packet marking may be based on the 5QI and ARP of the associated QoS flow.
- (R)AN maps PDUs from QoS flows to access-specific resources based on the QFI and the associated 5G QoS characteristics and parameters, also taking into account the N3 tunnel associated with the downlink packet.
- NOTE 2: Packet filters are not used for binding of QoS flows onto access-specific resources in (R)AN.
- If reflective QoS applies, the UE creates a new derived QoS rule. The packet filter in the derived QoS rule is derived from the (i.e. the header of the) DL packet, and the QFI of the derived QoS rule is is set according to the QFI of the DL packet.

Following characteristics apply for processing of uplink traffic:
- UE uses the stored QoS rules to determine mapping between UL User Plane traffic and QoS flows. UE transmits the UL PDUs using the corresponding access specific resource for the QoS flow based on the mapping provided by RAN.
- (R)AN transmits the PDUs over N3 tunnel towards UPF. When passing an UL packet from (R)AN to CN, the (R)AN determines the QFI value, which is included in the encapsulation header of the UL PDU, and selects the N3 tunnel.
- (R)AN performs transport level packet marking in the uplink, transport level packet marking may be based on the 5QI and ARP of the associated QoS Flow.
- UPF verifies whether QFIs in the UL PDUs are aligned with the QoS Rules provided to the UE or implicitly derived by the UE (e.g. in case of reflective QoS).
- UPF performs Session-AMBR enforcement and counting of packets for charging.

For UL Classifier PDU sessions, UL and DL Session-AMBR shall be enforced in the UPF that supports the UL Classifier functionality. In addition, the DL Session-AMBR shall be enforced separately in every UPF that terminates the N6 interface (i.e. without requiring interaction between the UPFs) (see clause 5.6.4).

For multi-homed PDU sessions, UL and DL Session-AMBR shall be enforced in the UPF that supports the Branching Point functionality. In addition, the DL Session-AMBR shall be enforced separately in every UPF that terminates the N6 interface (i.e. without requiring interaction between the UPFs) (see clause 5.6.4).

> NOTE 3: The DL Session-AMBR is enforced in every UPF terminating the N6 interface to reduce unnecessary transport of traffic which may be discarded by the UPF performing the UL Classifier/Branching Point functionality due to the amount of the downlink traffic for the PDU session exceeding the DL Session-AMBR.

The (R)AN shall enforce Max BitRate (UE-AMBR) limit in UL and DL per UE for non-GBR QoS flows. The UE shall perform UL rate limitation on PDU Session basis for non-GBR traffic using Session-AMBR, if the UE receives a session-AMBR.

Rate limit enforcement per PDU session applies for flows that do not require guaranteed flow bit rate. MBR per SDF is mandatory for GBR QoS flows but optional for non-GBR QoS flows. The MBR is enforced in the UPF.

The QoS control for Unstructured PDUs is performed at the PDU session level. When a PDU session is set up for transferring unstructured PDUs, SMF provides the QFI which will be applied to any packet of the PDU session to the UPF and UE.

> Editor's note: Whether and how the QoS flow level QoS control is supported for unstructured PDUs is FFS.

5.7.2 5G QoS Parameters

A 5QI is a scalar that is used as a reference to 5G QoS characteristics defined in clause 5.7.4, i.e. access node-specific parameters that control QoS forwarding treatment for the QoS flow (e.g. scheduling weights, admission thresholds, queue management thresholds, link layer protocol configuration, etc.).

The 5QI in the standardized value range have one-to-one mapping to a standardized combination of 5G QoS characteristics as specified in Table 5.7.4-1.

For non-standardized combinations of 5G QoS characteristics, a 5QI value from the non-standardized value range together with the 5G QoS characteristics are signalled over N2, N11 and N7 at the time of PDU session or QoS flow establishment.

> NOTE 1: On N3, each PDU (i.e., in the tunnel used for the PDU session) is associated with one 5QI via the QFI carried in the encapsulation header.

The QoS parameter ARP contains information about the priority level, the pre-emption capability and the pre-emption vulnerability. The priority level defines the relative importance of a resource request. This allows deciding whether a new QoS flow may be accepted or needs to be rejected in case of resource limitations (typically used for admission control of GBR traffic). It may also be used to decide which existing QoS flow to pre-empt during resource limitations.

The range of the ARP priority level is 1 to 15 with 1 as the highest level of priority. The pre-emption capability information defines whether a service data flow may get resources that were already assigned to another service data flow with a lower priority level. The pre-emption vulnerability information defines whether a service data flow may lose the resources assigned to it in order to admit a service data flow with higher priority level. The pre-emption capability and the pre-emption vulnerability shall be either set to 'yes' or 'no'.

The ARP priority levels 1-8 should only be assigned to resources for services that are authorized to receive prioritized treatment within an operator domain (i.e. that are authorized by the serving network). The ARP priority levels 9-15 may be assigned to resources that are authorized by the home network and thus applicable when a UE is roaming.

> NOTE 2: This ensures that future releases may use ARP priority level 1-8 to indicate e.g. emergency and other priority services within an operator domain in a backward compatible manner. This does not prevent the use of ARP priority level 1-8 in roaming situation in case appropriate roaming agreements exist that ensure a compatible use of these priority levels.

The Reflective QoS Attribute (RQA) is an optional parameter that is signalled to UE via N1 when Reflective QoS control via Control plane is used, as described in clause 5.7.5.4.3. The RQA is signalled on a QoS Flow basis.

In addition, the QoS flow may be associated with the parameter:

Notification control.

The Notification control may be provided for GBR QoS flows. The Notification control indicates whether notification should be made by the RAN if the QoS targets cannot be fulfilled for a QoS flow during the lifetime of the QoS flow. If it is set and QoS targets cannot be fulfilled, RAN sends a notification towards SMF.

> Editor's note: It is FFS whether the Notification control is needed for non GBR QoS flows.

For GBR QoS flows, the 5G QoS profile additionally include the following QoS parameters:

Guaranteed Flow Bit Rate (GFBR)—UL and DL;
Maximum Bit Rate (MFBR)—UL and DL.

The GFBR denotes the bit rate that may be expected to be provided by a GBR QoS flow. The MFBR limits the bit rate that may be expected to be provided by a GBR QoS flow (e.g. excess traffic may get discarded by a rate shaping function).

GFBR and MFBR are signalled on N2, N11, and N7 for each of the GBR QoS Flows for setting up the 5G QoS profile. The MBR per SDF, based on the information received from PCF, is signalled on N7 and N4.

Each PDU Session of a UE is associated with the following aggregate rate limit QoS parameter:

per Session Aggregate Maximum Bit Rate (Session-AMBR).

The subscribed Session-AMBR is a subscription parameter which is retrieved from UDM. SMF may use the subscribed Session-AMBR or modify it based on local policy or use the authorized Session-AMBR received from PCF to get the Session-AMBR, which is signalled on N4 to the appropriate UPF entity/ies. The Session-AMBR limits the aggregate bit rate that can be expected to be provided across all Non-GBR QoS flows for a specific PDU session.

Each UE is associated with the following aggregate rate limit QoS parameter:

per UE Aggregate Maximum Bit Rate (UE-AMBR).

The UE-AMBR limits the aggregate bit rate that can be expected to be provided across all Non-GBR QoS flows of a UE. Each (R)AN shall set its UE-AMBR to the sum of the Session-AMBR of all PDU Sessions with active user plane to this (R)AN up to the value of the subscribed UE-AMBR. The subscribed UE-AMBR is a subscription parameter which is retrieved from UDM and provided to the (R)AN by the AMF and the Session-AMBR is provided to the (R)AN by the SMF.

5.7.3 5G QoS Characteristics

This clause specifies the 5G QoS characteristics associated with 5QI. The characteristics describe the packet forwarding treatment that a QoS flow receives edge-to-edge between the UE and the UPF in terms of the following performance characteristics:

1 Resource Type (GBR or Non-GBR);
2 Priority level;
3 Packet Delay Budget;
4 Packet Error Rate.

The 5G QoS characteristics should be understood as guidelines for setting node specific parameters for each QoS flow e.g. for 3GPP radio access link layer protocol configurations. The 5G QoS characteristics for 5QI in the standardized value range are not signalled on any interface.

The 5G QoS characteristics for 5QI in the non-standardized value range, are signalled over N2, N11 and N7 at the time of the PDU Session or QoS flow establishment.

The Resource Type determines if dedicated network resources related QoS Flow-level Guaranteed Flow Bit Rate (GFBR) value are permanently allocated (e.g. by an admission control function in a radio base station). GBR QoS Flow are therefore typically authorized "on demand" which requires dynamic policy and charging control. A Non GBR QoS flow may be pre-authorized through static policy and charging control.

The Packet Delay Budget (PDB) defines an upper bound for the time that a packet may be delayed between the UE and the UPF that terminates the N6 interface. For a certain 5QI the value of the PDB is the same in uplink and downlink. In the case of 3GPP access, the PDB is used to support the configuration of scheduling and link layer functions (e.g. the setting of scheduling priority weights and HARQ target operating points).

NOTE 1: The PDB denotes an end-to-end "soft upper bound".

Editor's note: What will be the PDB confidence level e.g. whether 98 percent is enough or a more aggressive confidence level e.g. 99 percent is needed for 5G is FFS.

The Packet Error Rate (PER) defines an upper bound for the rate of SDUs (e.g. IP packets) that have been processed by the sender of a link layer protocol (e.g. RLC in RAN of a 3GPP access) but that are not successfully delivered by the corresponding receiver to the upper layer (e.g. PDCP in RAN of a 3GPP access). Thus, the PER defines an upper bound for a rate of non-congestion related packet losses. The purpose of the PER is to allow for appropriate link layer protocol configurations (e.g. RLC and HARQ in RAN of a 3GPP access). For a certain 5QI the value of the PER is the same in uplink and downlink.

Editor's note: Whether for non-standardized 5QI value range "allowed boundaries" for the 5G QoS characteristics needs to be specified e.g. minimum allowed PDB<X ms, PLR<10^-X, etc. is FFS.

5.7.4 Standardized 5QI to QoS Characteristics Mapping

The one-to-one mapping of standardized QFI & 5QI values to 5G QoS characteristics is specified in table 5.7.4-1.

[Table 5.7.4-1 of 3GPP TS 23.501 V1.0.0, entitled "Standardized 5QI to QoS characteristics mapping", is omitted]

Editor's note: It is starting point for definition for Standardized 5QI to QoS characteristics mapping, this table will be extended/updated to support service requirement for 5G, e.g. ultra low latency service.

5.7.5 Reflective QoS 5.7.5.1 General

The support for reflective QoS over AN is under control of the 5GC. The reflective QoS is achieved by creating a derived QoS rule in the UE based on the received downlink traffic. It shall be possible to apply reflective QoS and non-reflective QoS concurrently within the same PDU session. For traffic that is subject to reflective QoS, the UL packet gets the same QoS marking as the reflected DL packet.

5.7.5.2 UE Reflective QoS Procedures 5.7.5.2.1 General

For a UE supporting reflective QoS function, and if reflective QoS function is enabled by the 5GC for some traffic flows, the UE shall create a derived QoS rule for the uplink traffic based on the received downlink traffic. The UE shall use the derived QoS rules to determine mapping between uplink traffic and QoS flow.

A UE not supporting Reflective QoS shall ignore any indication of Reflective QoS.

5.7.5.2.2 UE Derived QoS Rule

The UE derived QoS rule contains following parameters:
  Packet Filter
  QFI
  precedence value.

The UL packet filter is derived based on the received DL packet.

When Reflective QoS is activated via User Plane the precedence value for all derived QoS rules is set to a standardised value.

Editor's note: When Reflective QoS is activated via User Plane it is FFS whether and how the standardised value is overridden by a new value on per-PDU Session basis.

When Reflective QoS is controlled via Control Plane the precedence value for a derived QoS rule within the scope of the Control Plane activation (i.e. QoS Flow, PDU Session) is set to a value that is signalled via the Control Plane.

5.7.5.3 UPF Procedures for Supporting Reflective QoS

When the User Plane reflective QoS is enabled by the 5GC, the UPF shall include the Reflective QoS Indication (RQI) in the encapsulation header on N3 reference point together with the QFI.

5.7.5.4 Reflective QoS Control 5.7.5.4.1 General

Reflective QoS may be controlled via User Plane or via Control Plane. The 5GC determines whether to control the reflective QoS function via Control Plane or User Plane based on policies and type of access.

5.7.5.4.2 Reflective QoS Control via User Plane

Reflective QoS is controlled via User Plane on per-packet basis by using the RQI in the encapsulation header on N3 reference point together with the QFI, together with a Reflective QoS Timer (RQTimer) value that is either signaled to the UE upon PDU Session establishment or set to a default value.

NOTE: It is up to Stage 3 to define the RQ Timer values.

When the 5GC determines to control reflective QoS via User Plane for specific SDF, the SMF shall include an indication in the corresponding SDF information provided to the UPF via N4 interface. For DL packets corresponding to this SDF, the UPF may set the RQI bit in the encapsulation header on the N3 reference point.

Upon reception of a DL packet that is subject to Reflective QoS the UE creates a UE derived QoS rule and starts a timer set to the RQ Timer value. If there is already an existing UE derived QoS rule with the same packet filter the UE restarts the timer for this UE derived QoS rule.

NOTE: The Reflective QoS activation via User Plane is used to avoid out-of-band signalling (e.g. for some non 3GPP accesses).

Editor's note: RAN WG2 needs to define how the N3 indication that downlink packet is subject to Reflective QoS is conveyed to UE over the radio interface. Depending on the RAN WG2 solution, the RAN may need to be instructed which QoS flows are subject to Reflective QoS. How and when this is done is FFS.

Editor's note: It is FFS how to minimize the processing burden incl. impact of multiple RQ Timers in the UE for Reflective QoS.

Editor's note: Whether other means to deactivate Reflective QoS are needed is FFS Upon timer expiry associated with a UE derived QoS rule the UE deletes the corresponding UE derived QoS rule.

5.7.5.4.3 Reflective QoS Control Via Control Plane

Reflective QoS is controlled via Control Plane on per-QoS flow basis. Upon QoS flow establishment the UE is provided with a Reflective QoS Timer (RQ Timer) value that is specific to the QoS flow.

When the 5GC determines to control reflective QoS via Control Plane, the SMF shall include the Reflective QoS Attribute (RQA) in the QoS flow parameters which are sent to the UE via N1 interface.

When the UE receives a DL packet on a QoS Flow for which the RQA is set RQI the UE creates a UE derived QoS rule and starts a timer set to the RQ Timer value. If there is already an existing UE derived QoS rule with the same packet filter the UE restarts the timer for this UE derived QoS rule.

Upon timer expiry associated with a UE derived QoS rule the UE deletes the corresponding UE derived QoS rule.

NOTE: The Reflective QoS control via ControlPlane is used for coarse-grained control (i.e per QoS flow).

Editor's note: whether other means to deactivate Reflective QoS are needed is FFS.

Editor's note: It is FFS how to minimize the impact on the UE of multiple RQ Timers.

R2-1707159 discussed SDAP Header Format as follows:

2.1 Transparent mode for SDAP

As agreed in the last meeting there are cases when the SDAP header is not needed (e.g. when operating in LTE+DC mode towards EPC or when the network does not intend to use any reflective mapping). When the network does not configure the SDAP header one could model this in a way that the SDAP layer is absent. However, this makes the protocol look different depending on an RRC configuration. Hence, a cleaner solution is to model the absence of the SDAP header as "SDAP transparent mode" as done already in several other 3GPP protocols. In this way, SDAP can always be drawn on top of PDCP. Also a PDCP SDU is always an SDAP PDU.

Proposal 1 When RRC de-configures the SDAP header, this is modelled as SDAP transparent mode.

2.2 SDAP Header Format

In RAN2 97-bis meeting, decision was made to include Flow ID in SDAP header and to have the header byte aligned. Yet, the question of Flow Id length remains open. Possible sizes of flow ID are from 7 bits up to 16 bits when SDAP header is assumed to be one or two bytes and Maximum defined QFI value in QFI table defined by SA is 79 [1]. Flow ID value range with 7-bits should be already sufficient as it allows 128 flows to exist in one PDU session. Having larger Flow ID range requires UE to allocate more resources for Flow to DRB mapping.

TABLE 1

3GPP TS23.501 System Architecture for 5G System, Stage2, V0.4.0 (2017-04)

5.7.5.4.2 Reflective QoS Activation via User Plane
When the 5GC determines to activate reflective QoS via U-plane, the SMF shall include a QoS rule including an indication to the UPF via N4 interface to activate User Plane with user plane reflective. When the UPF receives a DL packet matching the QoS rule that contains an indication to activate reflective QoS, the UPF shall include the RQI in the encapsulation header on N3 reference point. The UE creates a UE derived QoS rule when the UE receives a DL packet with a RQI. (Reflective QoS Indication).

Based on the input from SA2 that UEs shall be told whether a DL packet requires an update of the NAS level SDF-to-Flow mapping. We propose that there is one-bit indication in the DL header. When the bit is set to 1, the UE indicates to NAS that it shall determine and possibly update the SDF-to-Flow mapping based on the Flow-ID present in the SDAP header [2].

Proposal 2 The DL SDAP header includes 1-bit NAS-RQI indication that indicates whether the UE shall create (or update) a UE derived QoS rule.

Similarly, to NAS RQI, there could be AS RQI bit indication in SDAP header indicating whether the UE shall create or update a QoS Flow to DRB mapping. Having both, NAS and AS RQI indication would require the SDAP header to be 2-bytes assuming that a 6-bit flow id length is not sufficient. FIG. 1 shows the header when both, AS and NAS RQI exists in the header. Length of the Flow ID is between 7 and 16. [FIG. 1 of R2-1707159, entitled "DL SDAP header with 8-bit Flow ID, NAS-RQI, AS-RQI and 6-bit Reserved field", is omitted]

Observation 1 In DL, when NAS-RQI and AS-RQI fields are present and Flow ID is greater than 7-bits, SDAP header grows to 2 bytes Having NAS-RQI and AS-RQI allows gNB transmitter to omit the AS Flow ID in downlink header when neither the NAS RQI bit nor the AS RQI bit is set. This would allow reducing the header size to one octet in all DL packets that should not trigger any filter-update. But of course, it would also result in a variable SDAP header size. Such header is presented in the FIG. 1.

[FIG. 2 of R2-1707159, entitled "DL SDAP header with 1-bit NAS-RQI, 1-bit AS-RQI and Flow ID omitted (AS RQI=0)", is omitted]

The header length variation in the SDAP header and adds complexity when e.g. ROHC needs to identify the starting point of the IP packet in the PDCP layer.

Considering that updating the Flow-ID to DRB mapping is significantly easier than the update of the NAS filters, we don't think that such an explicit indication should be added. Without that indication a header length of one byte provides space for a 7-bit Flow ID length.

From DRB to Flow ID mapping perspective in UE, it is not desirable to have longer Flow ID range than required as UE is required to maintain Flow to DRB mapping table. The range of 128 Flow IDs is sufficient for the use cases that currently exists [1].

The resulting downlink SDAP header is depicted in FIG. 3. [FIG. 3 of R2-1707159, entitled "DL SDAP header with 7-bit Flow ID and NAS-RQI, is omitted]

Proposal 3 The DL and UL SDAP header contains a 7-bit Flow ID

For UL, Flow ID provides information to the gNB from which gNB is able to observe the QoS marking carried in the NG3 UL header. The NAS-RQI is not required. Hence the resulting UL header has one spare bit (R) for later use as shown in FIG. 4.

[FIG. 4 of R2-1707159, entitled "UL SDAP header when 7-bit Flow ID is used, is omitted]

Proposal 4 The UL SDAP header has one spare bit (R) for later use.

In previous meeting, some companies proposed to have control PDU for SDAP layer. Information carried by the control PDU would be related to the state of NAS and AS usage. This information can carried with the methods proposed above. Furthermore, RRC signalling covers QoS features, which would make control element information redundant. Since SDAP layer is used currently only with QoS and it is currently tightly coupled with the PDCP entity, control PDU would add complexity that may not be justified with the benefits. Additionally, dynamic SDAP header introduces complexity to the ROHC implementation as the position of the IP packet needs to be known by ROCH. Alternatively having SDAP header at the end would avoid the ROCH problems but introduce coupling of SDAP header with PDCP SDU length information. Parsing from the end with dynamic headers would create complexity to the receiver parser as the receiver would need to predict the length of the SDAP header or have it indicated otherwise.

Proposal 5 Control headers are not introduced in SDAP layer.

Proposal 6 SDAP header is placed at the beginning of the PDU.

R2-1707160 discussed reflective QoS and presence of Flow-ID as follows:

Presence of SDAP Header and QoS Flow ID

To enable reflective QoS, the RAN marks downlink packets over Uu with a QoS flow ID. The UE marks uplink packets over Uu with the QoS flow ID for the purposes of marking forwarded packets to the CN.

RAN2-97 bis agreed that . . . .

DL packets over Uu are not marked with "Flow ID" at least for cases where UL AS reflective mapping and NAS reflective QoS is not configured for DRB.

AS layer header include the UL "Flow ID" depending on network configuration RAN2-98 discussed the topic again and concluded the following:

1. The QoS flow ID is presence once the AS reflective QoS is active. FFS whether it is always present.
2. gNB should be informed when NAS layer reflective QoS is activated (e.g. can be used). It is FFS how we handle NAS reflective QoS and dependent on how/when it will be provided.
3. RAN2 will support a mode in which SDAP header is not present and is configured per DRB. If configured, FFS how the different fields are handled.

Dynamic Presence of QoS Flow ID

Bullet 3 above implies that the eNB configures by RRC for each DRB whether or not the UE shall include the SDAP header in uplink PDCP SDUs and whether the SDAP header is present in DL PDCP SDUs. According to bullet 1, it should be discussed further whether the "QoS flow ID", once SDAP is configured, "is always present" or whether it may be present only dynamically. To achieve the latter the SDAP header would need to indicate with one bit the presence of the "QoS Flow ID". Since such an indication would consume one bit itself it would not allow reducing the size of the SDAP header below one octet. Hence, we consider it more efficient to aim for an SDAP header that has a fixed size of one byte (if configured to be present by RRC).

Proposal 1 If the SDAP is configured for a DRB by means of RRC, the "QoS Flow ID" is present in UL and DL packets on that DRB (not dynamically enabled/disabled).

Re-Configuring Presence of SDAP Header

Since UE and network must be aware at any point in time which PDCP SDUs contain an SDAP header, the presence of this header should only be changed by a synchronized reconfiguration, i.e., RRCConnectionReconfiguration including mobilityControlInfo. One should note that this still requires that the PDCP receiver entity informs the SDAP entity for each delivered PDCP PDU whether the SDAP header is present. If one would like to avoid that, RAN2 should restrict the configuration of SDAP header to full configuration (fullConfig). However, we consider it acceptable to allow enabling/disabling the SDAP header during a handover.

Proposal 2 The eNB may change the presence of the SDAP header only by means of a handover, i.e., a synchronized reconfiguration.

Due to the decision to make SDAP a separate protocol above PDCP, the RoHC compressor and decompressor (which are specified to be part of PDCP) must now peek into the SDAP PDU and work with the SDAP SDU (the IP packet). While this is not a nice design, we believe that with the two proposals above both the UE and the network have all information that is necessary to perform RoHC.

Observation 1 Based on the RRC configuration RoHC compressor and decompressor entities in UE and network side can determine the position of the IP packet inside each PDCP PDU, i.e., whether an SDAP header is present or not.

[ . . . ]

Annex: QoS-Related Agreements in Previous Meetings

RAN2-95 discussed the basic principles of the NR QoS framework and reached the following agreements:

| | Agreements |
|---|---|
| 1 | For DL for a non-GBR flow, the eNB sees an indication over NG-u and based on the indication the eNB maps the packet to a DRB of an appropriate QoS. RAN2 understanding of SA2 agreements is that eNB has a QoS profile associated with the indication. |
| FFS | whether there is a requirement for every different QoS indication to be mapped to a different radio bearer. |
| 2 | Functionality is required to differentiate flows from different PDN-connections over the radio interface (e.g. by using separate DRBs or by an explicit indication in a header) |
| 3 | For DL, the eNB establishes DRBs for the UE taking the QoS profiles in to account. |
| FFS | how the DRB is established in the first packet is an UL packet. |

At RAN2-95 bis some further agreements were achieved and the first of the FFSs above was resolved:

| | Agreements |
|---|---|
| 1: | RAN determines the mapping relationship between QoS flow (as determine by the UE in UL or marked by the CN in DL) and DRB for UL and DL. |
| 1a | RAN can map multiple QoS flows to a DRB. |
| 2 | Specification will not forbid a GBR flow and non-GBR flow to be mapped to the same DRB, but we will not introduce mechanisms to optimise this case. |

-continued

| | Agreements |
|---|---|
| 3 | Specification will not forbid more than one GBR flow to be mapped to the same DRB, but we will not introduce mechanisms to optimise this case. |
| FFS: | Whether traffic from different PDU sessions can be mapped to one DRB or not. |

| | Agreements |
|---|---|
| 1 | Default DRB is established by eNB at PDU session establishment (or an existing DRB may be used if mapping of more than one session to a DRB is allowed) |
| 2 | If the first packet of the flow is UL packet, if no mapping rule is configured in the UE, the packet is sent through default DRB to the network. |
| FFS | How and when the network can remap the flow to more appropriate DRB. |
| FFS | the first packet is handled in the case that pre-authorised QoS is configured |
| FFS | whether the pre-authorised QoS applies to RAN or only to the UE. |
| FFS | whether there is a single level of mapping from UL TFT (5 tuple) to DRB, or whether there is a 2 level mapping from UL TFT to QoS flow and then from QoS flow to DRB. |

RAN2 #96:

| | Agreement |
|---|---|
| 1: | Traffic from different PDU sessions are mapped to different DRBs |
| 2: | In DL we have a 2-step mapping of IP flows, in which NAS is responsible for the IPflow->QOSflow mapping, and AS is responsible for the QOSflow->DRB mapping (confirmation of SA2 agreement status). |
| 3: | In UL we have a 2-step mapping of IP flows, in which NAS is responsible for the IPflow->QOSflow mapping, and AS is responsible for the QOSflow->DRB mapping. |
| 4 | DL packets over Uu are marked in band with QOS-flow-id for the purposes of reflective QoS |
| 5 | UL packets over Uu are marked in band with QOS-flow-id for the purposes of marking forwarded packets to the CN. |
| FFS | for bullets 4 and 5 whether it can be semi-statically configured to not include the QOS flow ID in some cases. |
| FFS | for bullets 4 and 5 whether it might be possible to use a shorter id over the radio compared to that received from the CN. This is a stage 3 issue. |

| | Agreements |
|---|---|
| 1 | For reflective QoS, the UE determines QoS Flow ID to DRB mapping in the uplink based on the downlink packets received within a DRB and applies those filters for mapping uplink Flows to DRBs. |
| 2 | The UE "continuously" monitors the QoS Flow ID in downlink PDCP packets and updates the reflective QoS Flow ID to DRB mapping in the uplink accordingly. |
| 3 | RRC can configure an uplink mapping |
| FFS | The precedence of the RRC configured mapping and reflective QoS (e.g. can reflective QoS update an RRC configured mapping) |
| Working assumption: | If an incoming UL packet does not match a QoS Flow ID to DRB mapping (neither a configured nor a determined via reflective QoS), the UE shall map that packet to the default DRB of the PDU session. |

=>FFS whether the QoS field is added by PDCP or a new protocol layer above PDCP.

RAN2 Ad-Hoc January 2017:

| | Agreements |
|---|---|
| 1: | A new user plane AS protocol layer (e.g. PDAP) above PDCP should be introduced to accommodate all the functions introduced in AS for the new QoS framework, including: QOS flow->DRB routing; QoS-flow-id marking in DL packets; QoS-flow-id marking in UL packets; |
| 2 | The new protocol layer is applicable for all cases connecting to the 5G-CN |
| 3: | Single protocol entity is configured for each individual PDU session. |

RAN2-97 Athens:

| | |
|---|---|
| 1 | RAN2 to confirm that the timing of non-default DRB establishment (RAN to UE) for QoS Flow configured during PDU Session Establishment could be done NOT at the same time as PDU Session Establishment. (up to eNB implementation) |
| 2 | Working assumption form RAN2#96 is confirmed. i.e. First UL packet that doesn't have a mapping to a DRB, is mapped to a default DRB. |

| | |
|---|---|
| 1 | "Lossless HO", that is, lossless, in sequence without duplication to upper layers, should be supported in specification for intra-NR. |
| FFS | whether we support QoS flow remapping at handover and, if supported, whether the handover is lossless for this case. |

RAN2-97 bis Spokane (April 2017)

| | Agreements |
|---|---|
| 1 | NR/NR DC should support that different QoS flows of the same PDU session can be mapped to MgNB and SgNB. |
| 2 | In the case of NR/NR DC where different QoS flows of the same PDU session are mapped to MgNB and SgNB then there is one SDAP entity in the MgNB and one in SgNB for that PDU session. |
| RAN2 | understand that support of this behaviour is still under discussion on SA2 |

| Agreements: |
|---|
| New AS layer PDU is PDCP SDU |
| AS layer header is byte-aligned |
| DL packets over Uu are not marked with "Flow ID" at least for cases where UL AS reflective mapping and NAS reflective QoS is not configured for DRB. |
| AS layer header include the UL "Flow ID" depending on network configuration |

R2-1707161 discussed QoS flow remapping within the same Cell and in handover as follows:

2.1 Updating QoS-Flow to DRB Filters

At RAN2-96 it was discussed how the network can change a mapping of UL flows to DRBs and RAN2 agreed that "The UE "continuously" monitors the QoS Flow ID in downlink PDCP packets and updates the reflective QoS Flow ID to DRB mapping in the uplink accordingly".

The word "continuously" was put in quotation marks since companies wanted to study whether really each and every DL packet needs to be analysed.

We believe that this is the simplest way to allow the eNB to update the mapping by redirecting the packets of a DL flow onto a different DRB. For example, if the UE observes initially a downlink packet with Flow ID X on DRB 1, it creates an "Flow-to-DRB" filter that maps uplink packets with Flow ID X to DRB 1. But if the UE later observes a downlink packet with Flow ID X on DRB 2, it should change the filter for Flow X so that also the UL packets are mapped to DRB 2.

In the meantime, SA2 agreed however that the CN should indicate dynamically in the N3 (user plane) packet header that the UE shall use this packet's headers to create or update the NAS level reflective QoS mapping:

TABLE 2

3GPP TS23.501 System Architecture for 5G System, Stage2, V0.3.1 (2017-03)

5.7.5.4.2 Reflective QoS Activation via User Plane
When the 5GC determines to activate reflective QoS via U-plane, the SMF shall include a QoS rule including an indication to the UPF to activate User Plane with user plane reflective. When the UPF receives a DL packet matching the QoS rule that contains an indication to activate reflective QoS, the UPF shall include the RQI in the encapsulation header on N3 reference point. The UE creates a UE derived QoS rule when the UE receives a DL packet with a RQI (Reflective QoS Indication).

Based on the input from SA2 that UEs shall be told whether a DL packet requires an update of the NAS level SDF-to-Flow mapping, we suggest copying that indication into the SDAP header.

Proposal 1 If the NAS-RQI bit in a DL SDAP header is set to 1, the UE indicates to NAS that it shall determine and possibly update the SDF-to-Flow mapping based on the Flow-ID present in the SDAP header.

So far RAN2 assumed that the UE shall update the AS-level Flow-to-DRB mapping based on all received DL packets containing a Flow-ID. One could consider changing this so that the UE updates also the AS-level mapping only if explicitly told to do so. To achieve this, the SDAP header would however need to comprise a second bit which indicates separately but in a similar way whether the UE shall update the Flow-to-DRB mapping using the Flow-ID in the packet header. Obviously this would only leave 6 bit for the Flow ID and hence likely lead to 2 octet SDAP headers if 6 bit is considered too small. More discussion on the possible header formats can be found in 0. In that paper we conclude that the Flow-ID in the SDAP header should 7 bit.

Proposal 2 The Flow ID length for DL and UL in SDAP header is 7-bits.

Proposal 3 Since the NAS-RQI bit is only needed in DL SDAP headers, the UL SDAP header has one spare bit (R).

2.2 Packet Reordering Upon Re-Mapping QoS Flow to Another DRB

Some companies observed in the last meeting that the re-mapping of a QoS Flow to a different DRB may cause out-of-sequence packet delivery. This may happen when initial packets of the flow ended up in a low priority DRB and subsequent packets are mapped to a high priority DRB due to an updated Flow-to-DRB mapping. We agree with this observation but believe that the network can avoid this when performing the re-mapping at an occasion where the queues are empty. It may however not always be possible to ensure this for the uplink direction. But at least for initial re-mapping from a default DRB to another DRB, it is likely that higher layers are still in the initial handshaking phase (e.g. TCP SYN/SYN-ACK, TLS security setup, HTTP GET) and hence there will typically be very few packets in flight that could overtake each other.

Observation 1 When the NW re-maps a flow to a different DRB during the initial transaction phase of the flow, packet re-ordering is unlikely due to few packets being in flight.

Observation 2 When the NW re-maps a flow to a different DRB it can minimize the risk of re-ordering by postponing it to occasions when buffers are empty or at least small.

It was also mentioned that packet re-ordering upon Flow re-mapping could be avoided by means of an additional re-ordering function per QoS Flow (above PDCP). However, in accordance with the observations above, we don't see a need for such (complex) functionality on the UE side. If RAN2 believes the risk of packet re-ordering upon QoS-Flow remapping (in uplink direction) is unacceptably large, we suggest seeking for a relatively simple solution such as the following: Upon detecting a remapping of a flow to a different DRB (reflectively or explicitly) the PDCP transmitter copies all the not-yet-RLC-ACKed PDCP PDUs to the target DRB's PDCP entity. This may result in some duplicates but those don't matter for higher layers. Since we anyway assume that there will usually be only few packets in flight during the initial phase of a file transfer, the inefficiency due to the (few) duplicates would be negligible for the initial reflective QoS remapping described above. Of course, the approach would also avoid re-ordering on IP level if the network re-maps a flow during handover.

Moving (instead of copying) the data to another DRB would avoid the overhead but would require re-processing already pre-processed the PDCP PDUs of the source DRB.

Proposal 4 Additional UE functionality for avoiding possible out-of-order delivery when re-mapping a QoS-Flow to a different DRB (by explicit signalling or by update reflective QoS mapping) should not be introduced.

Proposal 5 If 0 is not agreeable (i.e., if RAN2 believes that re-ordering due to QoS flow re-mapping shall be avoided), the PDCP transmitter shall copy all the not-yet-RLC-ACKed PDCP PDUs to the target DRB's PDCP entity.

2.3 Precedence Order of Reflective and Configured Mapping

RAN2-96 did not yet agree on "The precedence of the RRC configured mapping and reflective QoS". There are basically three options:

1) An RRC configured mapping overrides any reflective mapping for that flow.
2) A newly derived reflective mapping overrides a mapping configured previously by RRC.
3) The UE applies always the most recent mapping, i.e., either provided by RRC or derived by reflective QoS We think that the second option would introduce an undesirable dependency between the RRC configuration and the user plane. For example, the RRC configuration (AS-Config) would not represent the mapping that the UE applies. This would be undesirable in case of mobility since the UE would not behave as expected by the target node. It would also remove the possibility to override a previous reflective QoS mapping by a dedicated configuration.

The third option suffers from possible race conditions since it may not be fully predictable whether the UE received a DL data packet or the RRCConnectionReconfiguration first. Also, just as the second option, ambiguities exist upon mobility.

Generally, we think that RRC signalling should always have precedence over L2 and L1 control signalling. It would ensure a clean split and avoid any ambiguity. Also during mobility this principle ensures that the target eNB is aware of all configured UL QoS mappings applied by the UE. Besides that, it would also allow the eNB to map a DL QoS flow onto a different DRB than the UL QoS flow with the same ID.

Proposal 6 If the eNB configures the UE with an "uplink QoS Flow to DRB filter", it overrides any reflective mapping for this QoS flow.

2.4 Maintaining QoS Mapping During Handover

In the context of inter-cell mobility, it should be discussed whether the UE maintains the reflective UL QoS filters. As mentioned above, the target eNB does not know the UE's reflective QoS filters from the AS-Config. One could consider that the source eNB provides the reflective UL QoS mappings to the target eNB (e.g. in AS-Context). Alternatively, the target node can change the QoS mapping and send the new mapping to the UE in the HO command (RRCConnectionReconfiguration). But we consider this being unnecessarily complex and it would also introduce risk of state mismatch. It appears simpler that the UE maintains a reflective UL QoS mapping as long as the DRB with which it is associated exists, i.e., also during normal RRC mobility. The UE releases the reflective UL QoS mapping when the eNB releases the DRB with which the mapping is associated.

Proposal 7 The UE maintains a reflective UL QoS mapping as long as the DRB with which it is associated exists, i.e., also during normal RRC mobility and upon bearer-type change. The UE releases the reflective UL QoS mapping when the eNB releases the DRB with which the mapping is associated.

S2-170065 provides the following description:

1.1 Reflective QoS Activation Via C-Plane

The FIGS. 2.1-1 depicts the reflective QoS procedure when the reflective QoS activation is signalled to UE via NG1.
[FIGS. 2.1-1 of S2-170065, entitled "Reflective QoS activation via C-plane", is omitted]

The detailed procedures are as followed:
1. When the SMF determines the Reflective QoS should be activated via C-plane, the SMF should transmit the Reflective QoS rule to the UPF via NG4, the reflective QoS profile to the AN (optionally) and Reflective QoS profile with RQI to UE via NG1.
2. The DN sends a packet which the reflective QoS rule will be used by UPF.
3. When the UPF receives a DL packet from the DN, it will transmit the DL packet using the reflective QoS rule.
4. AN sends the DL packet via the corresponding DRB based on the QoS marking.
5. UE determines to derive the QoS rule for the UL service data flow.

For the above case, if the reflective QoS is not used for all the service data flow using the same NAS-level QoS profile, the additional indicator (e.g. RQI) should be included in the packet to notify the UE which service data flow the reflective QoS should be used. In addition, RQI should also be included in the reflective QoS rule for the UPF to mark the packet with RQI. In this case, the RQI transferred via NG1 is not required. Therefore, the reflective QoS activation via C-plane should be used for coarse-grained, e.g. per QoS flow or per PDU session. It should not be used for per packet flow. In this case, the UPF and AN will not differentiate the packet handling logic between the reflective QoS mechanism and non-reflective QoS mechanism.

Furthermore, in the NextGen network the UE will access the NextGen CN over non-3GPP access utilise the 3GPP NAS signalling, the Reflective QoS activation via C-plane can be used in the non-3GPP access with no impact with the non-3GPP access technology.

Observation 1: The reflective QoS activation via C-plane should be used for coarse-grained case, e.g. Per QoS flow or per PDU session. It should not be used per packet flow.

Observation 2: The reflective QoS activation via C-plane can be used with access agnostic, e.g. it also can be used in non-3GPP access case.

Observation 3: When the reflective QoS is used for per QoS flow or per PDU session, the C-plane solution can simplify the UPF and RAN handling logic.

1.2 Reflective QoS Activation Via U-Plane

The FIGS. 2.2-1 depicts the reflective QoS procedure when the reflective QoS activation is sent to UE via U-plane.
[FIGS. 2.2-1 of S2-170065, entitled "Reflective QoS activation via U-plane", is omitted]

The detailed procedures are as followed:
1. When the SMF determines the Reflective QoS should be activated via U-plane, the SMF should transmit the Reflective QoS rule with RQI to the UPF via NG4.
2. The DN sends a packet which the reflective QoS rule will be used to UPF.
3. When the UPF receives a DL packet from the DN, if the UPF determines the packet subject to the reflective QoS it will transmit the DL packet with RQI.
4. AN sends the DL packet with RQI via the corresponding Access specific resource based on the QoS marking.
5. UE determines to derive the QoS rule for the UL service data flow according to the RQI.

For the above case, the UPF should differentiate the reflective QoS rule and the non-reflective QoS for RQI marking in the U-plane. Therefore, the RQI should be included in the reflective QoS rule. In addition the AN should be able to contain the RQI in the radio packet. This method is more suitable for finer granularity, e.g. per service data flow.

In addition, if the QoS characteristic is not standardized, the signalling over NG2 and NG1 is required. And when all the packets use this QoS characteristic, the U-plane solution is not suitable for this case.

Furthermore, for the case that the UE accesses the NextGen Core network via Non-3GPP access network, if the U-plane is used for the reflective QoS activation, Non-3GPP access network may need to be enhanced to include the indicator "RQI". However, it is hard to change the definition about non-3GPP access technology. Therefore, the U-plane is not recommended to be used in the case of non-3GPP access.

Observation 1: The reflective QoS activation via U-plane should be used for finer granularity and standardized QoS characteristic, e.g. Per service date flow.

Observation 2: The RQI should be added in the reflective QoS rule in the User plane solution.

Observation 3: The reflective QoS activation via U-plane should not be used in non-3GPP access.

RAN2 #98 Chairman's notes captured the following agreements made for related QoS:

| Agreements |
|---|
| 1: From RAN2 perspective the existing QoS parameters, and in particular the concept of QCI/5QI to abstract QoS requirements between CN and RAN should be maintained in NR/NGC. |

| | Agreements |
|---|---|
| 2: | RAN2 sees a benefit in providing a "averaging window" as new QoS parameter via N2. The RAN may use in this parameter in its scheduling decision e.g. to enforce MBR and GRB. |
| 3: | No additional parameters are recommendation to SA2. |
| 4: | RAN2 to ask SA2 to clarify the use and corresponding actions from CN related to the notification control to CN, if the QoS targets cannot be fulfilled in RAN |

| | Agreements of SDAP headers |
|---|---|
| 1. | The QoS flow ID is presence once the AS reflective QoS is active. FFS whether it is always present. |
| 2. | gNB should be informed when NAS layer reflective QoS is activated (e.g. can be used). It is FFS how we handle NAS reflective QoS and dependent on how/when it will be provided. |
| 3. | RAN2 will support a mode in which SDAP header is not present and is configured per DRB. If configured, FFS how the different fields are handled. |

RAN2 NR Ad Hoc #2 Chairman's notes captured the following agreements made for related QoS:

| | Agreements |
|---|---|
| 1 | At SN addition and at new PDU session establishment then MN makes the decision which QoS flows are moved SN |
| FFS | Whether the SN can reject the movement of a QoS flow. |
| 2 | Irrespective of which node makes the decision of where a QoS flow is mapped (to MN or SN) then RAN2 will aim that the RRC signalling is the same. |

| | Agreements |
|---|---|
| 1: | The MN makes the decision to move ongoing/existing QoS flows to the SN (this agreement does not imply whether the QoS flow is moved by moving a single flow or by moving a whole bearer) |
| FFS | Whether MN or SN takes the decision for flows being moved from SN to MN |
| 2: | The SN can reject the addition of a QoS flow, and inform the MN. |
| 3: | The DRB level offloading (i.e. offloading all QoS flows of a DRB) is supported between the MN and SN. |
| FFS: | The QoS flow level offloading between the MN and SN, and if supported then whether lossless handover can be supported. |
| 4: | The lossless handover user plane procedure could be reused for DRB level offloading, if mapping is maintained in the target node. |
| FFS: | If the case where mapping is not maintained can support lossless handover |
| 5: | The SN is responsible for the DRB management (e.g., setup, modify, release) of SCG/SCG-split bearers, and the QoS flow -> DRB mapping at the SN |

| | Agreements: |
|---|---|
| 1. | There is a need to tell the UE that it has to update the mapping rule. For the AS reflective QoS it is up to the RAN to decide when to update the mapping rules. FFS on the details of the header format. |
| 2. | It is up to the RAN to decide when and which mechanism, explicit RRC re-configuration and/or AS reflective QoS, should be used to provide mapping information to the UE. |

| | Agreements: |
|---|---|
| 3. | A UE follows the latest QoS flow to DRB mapping information regardless of the fact whether it was explicit RRC or AS reflective QoS. |
| 4. | Whether a SDAP header is present or not is configured by RRC per DRB |
| 5. | The gNB indicates to UE using RRC signaling the default DRB for a PDU session. |
| 6. | RAN decides and configures the default DRB for a PDU session. |

3GPP TS 38.323 specified status report, and header compression and decompression as follows:

5.4 Status Reporting 5.4.1 Transmit Operation

For AM DRBs configured by upper layers to send a PDCP status report in the uplink (statusReportRequired [3]), the receiving PDCP entity shall trigger a PDCP status report when:

upper layer requests a PDCP entity re-establishment;
upper layer requests a PDCP data recovery;
a PDCP Data PDU with P bit set to 1 is received;

Editor's Note: The triggers for PDCP status report are FFS.

If a PDCP status report is triggered, the receiving PDCP entity shall:

compile a PDCP status report as indicated below by:
setting the FMC field to the COUNT value of the first missing PDCP SDU;
if there is at least one out-of-sequence PDCP SDU stored, allocating a Bitmap field of length in bits equal to the number of COUNTs from and not including the first missing PDCP SDU up to and including the last out-of-sequence PDCP SDUs, rounded up to the next multiple of 8, or up to and including a PDCP SDU for which the resulting PDCP Control PDU size is equal to [8188] bytes, whichever comes first;
setting in the bitmap field as '0' for all PDCP SDUs that have not been received, and optionally PDCP SDUs for which decompression have failed;
setting in the bitmap field as '1' for all PDCP SDUs that have been received;
submit the PDCP status report to lower layers as the first PDCP PDU for transmission.

5.4.2 Receive Operation

For AM DRBs, when a PDCP status report is received in the downlink, the transmitting PDCP entity shall:

consider for each PDCP SDU, if any, with the bit in the bitmap set to '1', or with the associated COUNT value less than the value of FMC field as successfully delivered, and discard the PDCP SDU as specified in the subclause 5.3.

[ . . . ]

5.7 Header Compression and Decompression 5.7.1 Supported Header Compression Protocols and Profiles The header compression protocol is based on the Robust Header Compression (ROHC) framework [7]. There are multiple header compression algorithms, called profiles, defined for the ROHC framework. Each profile is specific to the particular network layer, transport layer or upper layer protocol combination e.g. TCP/IP and RTP/UDP/IP.

The detailed definition of the ROHC channel is specified as part of the ROHC framework [7]. This includes how to multiplex different flows (header compressed or not) over the ROHC channel, as well as how to associate a specific IP flow with a specific context state during initialization of the compression algorithm for that flow.

The implementation of the functionality of the ROHC framework and of the functionality of the supported header compression profiles is not covered in this specification.

In this version of the specification the support of the following profiles is described:

[Table 5.7.1-1 of 3GPP TS 38.323 V0.0.5, entitled "Supported header compression protocols and profiles" is omitted]

5.7.2 Configuration of Header Compression

PDCP entities associated with DRBs can be configured by upper layers [3] to use header compression.

5.7.3 Protocol Parameters

RFC 4995 has configuration parameters that are mandatory and that must be configured by upper layers between compressor and decompressor peers [7]; these parameters define the ROHC channel. The ROHC channel is a unidirectional channel, i.e. there is one channel for the downlink, and one for the uplink. There is thus one set of parameters for each channel, and the same values shall be used for both channels belonging to the same PDCP entity.

Editor's Note: Support for UL-only ROHC is FFS.

These parameters are categorized in two different groups, as defined below:
  M: Mandatory and configured by upper layers.
  N/A: Not used in this specification.

The usage and definition of the parameters shall be as specified below.
  MAX_CID (M): This is the maximum CID value that can be used. One CID value shall always be reserved for uncompressed flows. The parameter MAX_CID is configured by upper layers (maxCiD [3]).
  LARGE_CIDS: This value is not configured by upper layers, but rather it is inferred from the configured value of MAX_CID according to the following rule:
    If MAX_CID>15 then LARGE_CIDS=TRUE else LARGE_CIDS=FALSE.
  PROFILES (M): Profiles are used to define which profiles are allowed to be used by the UE. The list of supported profiles is described in section 5.7.1. The parameter PROFILES is configured by upper layers (profiles for uplink and downlink [3]).
  FEEDBACK_FOR (N/A): This is a reference to the channel in the opposite direction between two compression endpoints and indicates to what channel any feedback sent refers to. Feedback received on one ROHC channel for this PDCP entity shall always refer to the ROHC channel in the opposite direction for this same PDCP entity.
  MRRU (N/A): ROHC segmentation is not used.

5.7.4 Header Compression

The header compression protocol generates two types of output packets:
  compressed packets, each associated with one PDCP SDU
  standalone packets not associated with a PDCP SDU, i.e. interspersed ROHC feedback A compressed packet is associated with the same PDCP SN and COUNT value as the related PDCP SDU.

Interspersed ROHC feedback are not associated with a PDCP SDU. They are not associated with a PDCP SN and are not ciphered.

NOTE: If the MAX_CID number of ROHC contexts are already established for the compressed flows and a new IP flow does not match any established ROHC context, the compressor should associate the new IP flow with one of the ROHC CIDs allocated for the existing compressed flows or send PDCP SDUs belonging to the IP flow as uncompressed packet.

5.7.5 Header Decompression

If header compression is configured by upper layers for PDCP entities associated with user plane data, the PDCP PDUs are decompressed by the header compression protocol after performing deciphering as explained in the subclause 5.8.

5.7.6 PDCP Control PDU for Interspersed ROHC Feedback 5.7.6.1 Transmit Operation When an interspersed ROHC feedback is generated by the header compression protocol, the transmitting PDCP entity shall:
  submit to lower layers the corresponding PDCP Control PDU as specified in subclause 6.2.5 i.e. without associating a PDCP SN, nor performing ciphering.

5.7.6.2 Receive Operation

At reception of a PDCP Control PDU for interspersed ROHC feedback from lower layers, the receiving PDCP entity shall:
  deliver the corresponding interspersed ROHC feedback to the header compression protocol without performing deciphering.

According to 3GPP TS 23.501, QoS flow is the finest granularity of QoS differentiation in PDU (Packet Data Unit) session. The PDU session provides association between a UE and a data network that provides a PDU connectivity service.

According to 3GPP TS 38.300, a new AS layer, called SDAP (Service Data Adaptation Protocol), is specified to provide functions e.g. mapping between a QoS flow and a data radio bearer (DRB) and marking QoS flow ID (QFI) in both DL packets and UL packets. In addition, each SDAP entity is associated with one PDU session. There is at least one DRB (e.g. default DRB) for each PDU session. Each SDAP PDU may contain at least a IP packet. Each SDAP PDU may contain a SDAP header (if configured for UL and/or DL). The SDAP header may indicate at least a QFI used to identify a QoS flow for which the IP packet comes from the QoS flow. A SDAP PDU could be a PDCP (Packet Data Convergence Protocol) SDU (Service Data Unit).

Based on 3GPP TS 38.323, RoHC (Robust Header Compression) compression and decompression are performed in PDCP layer. RoHC compression and decompression could be performed based on header of IP packet. In addition, a PDCP status report may indicate those PDCP SDUs for which RoHC decompression have failed. Since SDAP entity is a protocol stack above PDCP layer, PDCP layer should know the position of IP packet in a SDAP PDU (i.e. PDCP layer should know whether SDAP header is present or not).

In one embodiment, a DRB may serve multiple QoS flows (for a PDU session) so that the gNB may configure UE to use SDAP header (in UL) for the DRB. When some QoS flow is modified to use another DRB or released, the DRB could serve only one QoS flow at this time. In that case, the gNB may reconfigure the UE not to use SDAP header (in UL) for the DRB. However, some PDCP SDUs including SDAP header may have been buffered in a PDCP entity/layer and to be transmitted (or retransmitted). After transmitting (or retransmitting) those PDCP SDU(s) including SDAP header, the receiving side of the PDCP entity/layer could treat those PDCP SDU(s) as not including SDAP header. When this situation occurs, the RoHC decompression on those PDCP SDU(s) may fail. If the PDCP entity/layer is associated with an UM RLC entity, then those PDCP SDU(s) may be discard due to failure of the RoHC decompression, which means data missing. However, if the PDCP entity/layer is associated with an AM RLC entity, then those PDCP SDU(s) may be retransmitted based on PDCP status report. Although retransmission of those PDCP SDU(s) is performed, the RoHC decompression may still fail for those retransmitted PDCP SDU(s), which means not only data missing but also resource waste.

FIG. 5 illustrates this issue. In FIG. 5, the PDCP SDU #1 and the PDCP SDU #2 have been buffered in the PDCP transmission buffer when the gNB configures the UE not to use SDAP header (in UL) for the DRB. Therefore, both the PDCP SDU #1 and #2 include SDAP header. After receiving the reconfiguration, both the PDCP SDU #1 and #2 may be transmitted or retransmitted. On the receiving side of the PDCP layer, both the PDCP SDU #1 and #2 could not be handled correctly (e.g. failing RoHC decompression) and then be discarded. Even if transmitting side of the PDCP layer could retransmit both the PDCP SDU #1 and #2, the RoHC decompression in the receiving side would still fail. The receiving side may successfully perform RoHC decompression for both PDCP SDU #3 and #4 due to no SDAP header included.

3GPP R2-1707160 proposes to synchronize SDAP header reconfiguration by means of a handover. In the handover, the UE shall reset MAC layer, re-establish PDCP layer and RLC layer for all RBs that are established according to the legacy LTE system (as discussed in 3GPP TS 36.331). As a result, all buffers in MAC layer and RLC layer are flushed. However, the issue may be still there because the buffer in PDCP layer is not flushed according to 3GPP TS 38.323. Therefore, using a handover procedure to synchronize SDAP header reconfiguration cannot settle the issue and seems to be overkill because all the PDUs stored in the buffers may need to be retransmitted, which wastes lots of radio resources.

In general, several solutions described below could be used instead.

Alternative 1: Change of Presence of SDAP Header is Started from a Specific PDU—

The specific PDU could be a SDAP PDU or a PDCP PDU. The specific PDU could be a specific UL PDU or a specific DL PDU. When changing the presence of SDAP header (on UL and/or DL) for a DRB is needed, the gNB may reconfigure the UE to include or not to include SDAP header in SDAP PDU(s) mapped to the DRB. The gNB may transmit a dedicated signaling to the UE for changing the presence of SDAP header. The dedicated signaling could be a RRC signaling, a SDAP signaling, a PDCP signaling, a RLC signaling, a MAC control element, or a physical signaling.

In one embodiment, in the dedicated signaling, a first indication used to derive the specific UL PDU and/or a second indication used to derive the specific DL PDU could be included. In one embodiment, the first indication could be a sequence number of a SDAP PDU or a PDCP PDU for UL, and the second indication could be a sequence number of a SDAP PDU or a PDCP PDU for DL. In one embodiment, the sequence number could be a COUNT value or a PDCP SN (as discussed in 3GPP TS 38.323). The COUNT value could be derived from a HFN and a PDCP SN (as discussed in 3GPP TS 38.323). As described in 3GPP TS 38.323, a SN field is included in each PDCP (data) PDU to indicate the sequence number of the PDCP (data) PDU. Basically, the sequence number is incremented by one for every PDCP (data) PDU or PDCP SDU. The UE could (start to) apply the change of presence of SDAP header on the SDAP PDU or the PDCP PDU associated with the sequence number.

In one embodiment, the first indication could be a number of N used to derive an $N^{th}$ SDAP PDU or an $N^{th}$ PDCP PDU for UL, and the second indication could be a number of N used to derive an $N^{th}$ SDAP PDU or a $N^{th}$ PDCP PDU for DL. The UE could (start to) apply the change of presence of SDAP header on the $N^{th}$ SDAP PDU or the $N^{th}$ PDCP PDU.

In one embodiment, the UE may determine the specific PDU based on e.g. pre-configured or specified value. In one embodiment, the pre-configured or specified value could be used to derive an $N^{th}$ SDAP PDU or an $N^{th}$ PDCP PDU for UL and DL. The UE could (start to) include SDAP header in the $N^{th}$ SDAP PDU or the $N^{th}$ PDCP PDU.

In one embodiment, a first pre-configured or a first specified value could be used to derive an $N^{th}$ SDAP PDU or an $N^{th}$ PDCP PDU for UL, and a second pre-configured or a second specified value could be used to derive an $N^{th}$ SDAP PDU or an $N^{th}$ PDCP PDU for DL.

Figure 6:
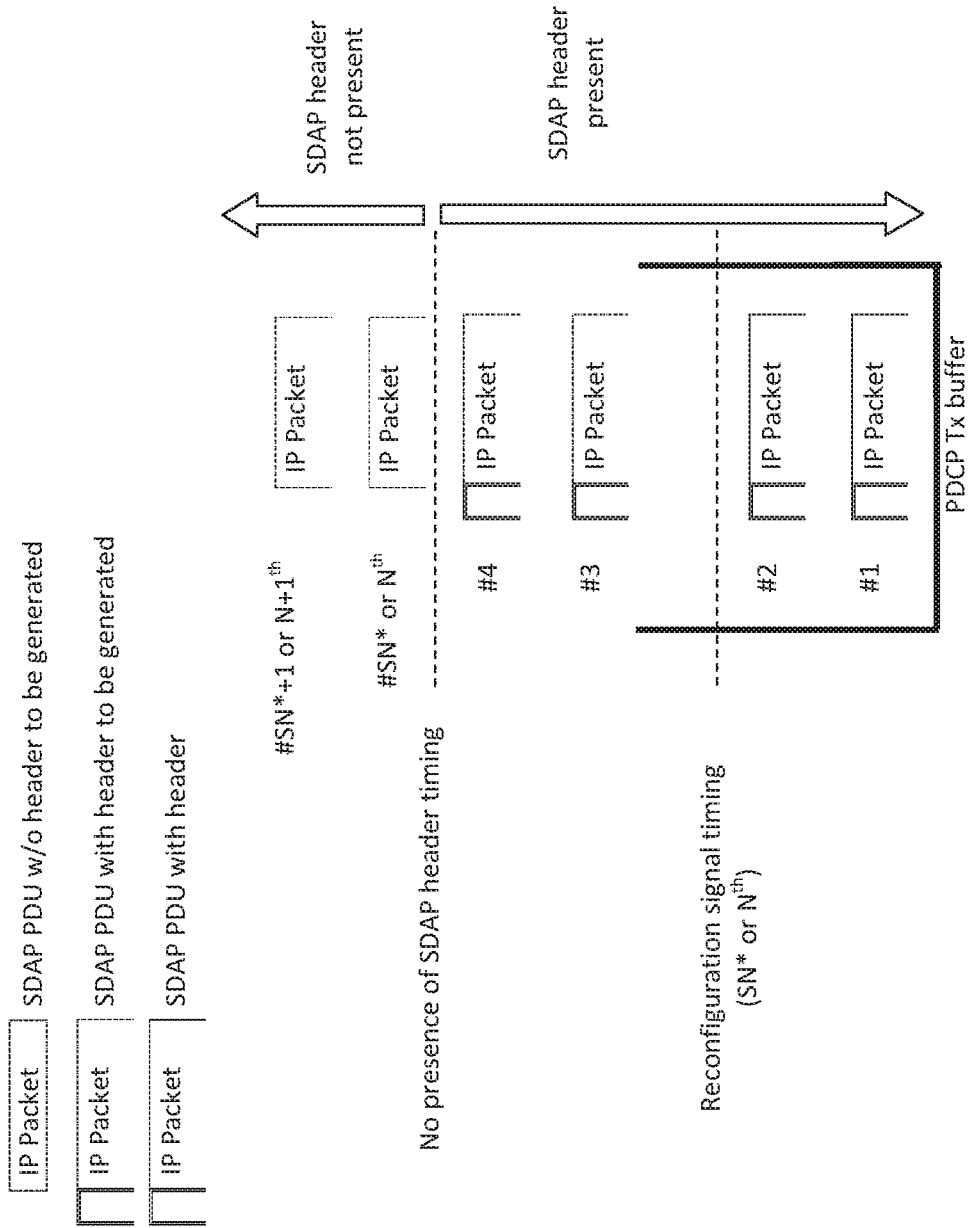
FIG. 6 is a diagram according to one exemplary embodiment.

In case of changing from no presence of SDAP header to presence of SDAP header (i.e. each SDAP PDU including a SDAP header), the UE may include SDAP header in the specific UL PDU (and all UL PDUs following the specific UL PDU) till next change of presence of SDAP header, and may consider that the specific DL PDU (and all DL PDUs following the specific DL PDU) includes SDAP header till next change of presence of SDAP header. This concept could be illustrated in FIG. 6. The UE may take SDAP PDU/PDCP PDU including SDAP header into account to perform RoHC decompression on the specific DL (Downlink) PDU (and all DL PDUs following the specific DL PDU). The gNB may take SDAP PDU/PDCP PDU including SDAP header into account to perform RoHC decompression on the specific UL PDU (and all UL PDUs following the specific UL PDU).

Figure 7:
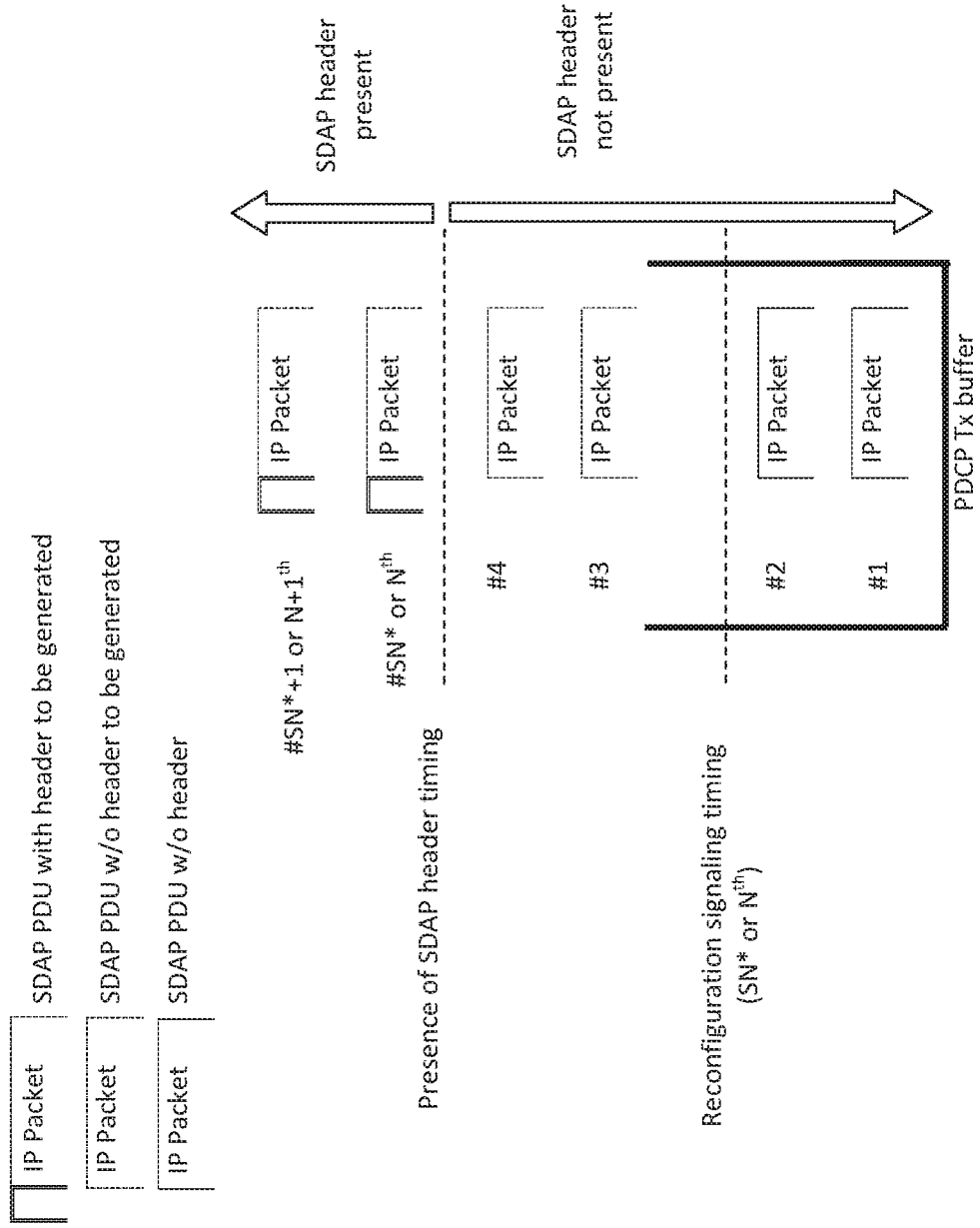
FIG. 7 is a diagram according to one exemplary embodiment.

In case of changing from presence of SDAP header to no presence of SDAP header (i.e. each SDAP PDU not including a SDAP header), the UE may not include SDAP header in the specific UL PDU (and all UL PDUs following the specific UL PDU) till next change of presence of SDAP header, and may consider that the specific DL PDU (and all DL PDUs following the specific DL PDU) does not include SDAP header till next change of presence of SDAP header. This concept could be illustrated in FIG. 7. The UE may take SDAP PDU not including SDAP header into account to perform RoHC decompression on the specific DL PDU (and all DL PDUs following the specific DL PDU). The gNB may take SDAP PDU not including SDAP header into account to perform RoHC decompression on the specific UL PDU (and all UL PDUs following the specific UL PDU).

Alternative 2: PDCP Header of a PDCP PDU could Indicate if SDAP Header is Present in the PDCP PDU—

The PDCP header could include a field used for the indication. In one embodiment, the field could be set to a first value if the SDAP header is included in a PDCP SDU of the PDCP PDU and set to a second value if the SDAP header is not included in the PDCP SDU.

If presence of SDAP header (i.e. each SDAP PDU including a SDAP header) is configured, the UE may set such field with the first value in the PDCP header of a UL PDCP PDU, and the gNB may set such field with the first value in the PDCP header of a DL PDCP PDU. The gNB may derive position of the PDCP SDU of the UL PDCP PDU based on such field in the UL PDCP PDU, and may perform RoHC decompression on the PDCP SDU of the UL PDCP PDU. The UE may derive position of the PDCP SDU of a DL PDCP PDU based on such field in the DL PDCP PDU and perform RoHC decompression on the PDCP SDU of the DL PDCP PDU.

If presence of SDAP header (i.e. each SDAP PDU not including a SDAP header) is not configured, the UE may set such field with the second value in the PDCP header of a UL PDCP PDU, and the gNB may set such field with the second value in the PDCP header of a DL PDCP PDU. The gNB could consider that the PDCP SDU of the UL PDCP PDU does not include SDAP header in the UL PDCP PDU due to such field and perform RoHC decompression on the PDCP SDU of the UL PDCP PDU. The UE could consider that the PDCP SDU of a DL PDCP PDU does not include SDAP header in the DL PDCP PDU due to such field and perform RoHC decompression on the PDCP SDU of the DL PDCP PDU.

In one embodiment, the field could derive the length of the SDAP header. A length of zero (0) could mean that the SDAP header is not included in the PDCP SDU.

If presence of SDAP header (i.e. each SDAP PDU including a SDAP header) is configured, the UE may set such field with the length of the SDAP header in the PDCP header of a UL PDCP PDU, and the gNB may set such field with the length of the SDAP header in the PDCP header of a DL PDCP PDU. The gNB may derive position of the PDCP SDU of the UL PDCP PDU based on such field in the UL PDCP PDU, and may perform RoHC decompression on the PDCP SDU of the UL PDCP PDU. The UE may derive position of the PDCP SDU of a DL PDCP PDU based on such field in the DL PDCP PDU, and may perform RoHC decompression on the PDCP SDU of the DL PDCP PDU.

If presence of SDAP header (i.e. each SDAP PDU not including a SDAP header) is not configured, the UE may set such field with zero value in the PDCP header of a UL PDCP PDU, and the gNB may set such field with zero value in the PDCP header of a DL PDCP PDU. The gNB could consider that the PDCP SDU of the UL PDCP PDU does not include SDAP header in the UL PDCP PDU due to such field and perform RoHC decompression on the PDCP SDU of the UL PDCP PDU. The UE could consider that the PDCP SDU of a DL PDCP PDU does not include SDAP header in the DL PDCP PDU due to such field and perform RoHC decompression on the PDCP SDU of the DL PDCP PDU.

Alternative 3: DRB Mobility Upon Change of Presence of SDAP Header—

When the DRB is established, presence of SDAP header could be configured and could not be reconfigured later (i.e. in lifetime of the DRB, the presence of SDAP header is not changed).

In one embodiment, the UE may use a first DRB configured with presence of SDAP header (i.e. each SDAP PDU including a SDAP header) to serve at least a QoS flow.

When there is no need to include SDPA header in UL SDAP PDU and there is no DRB configured with no presence of SDAP header (i.e. each SDAP PDU not including a SDAP header), the gNB may establish a second DRB with no presence of SDAP header. And the gNB could (re-)configure the UE to use the second DRB to serve the QoS flow.

When there is no need to include SDPA header in UL SDAP PDU and there is a second DRB configured with no presence of SDAP header, the gNB could (re-)configure the UE to use the second DRB to serve the QoS flow.

With this alternative, the UE could consider SDAP PDU not including SDAP header in a DL PDCP PDU received on the second DRB when performing RoHC decompression for the DL PDCP PDU, and the gNB could consider SDAP PDU not including SDAP header in a UL PDCP PDU received on the second DRB when performing RoHC decompression for the UL PDCP PDU.

In one embodiment, the UE may use a first DRB configured with no presence of SDAP header to serve a first QoS flow.

When there is need (e.g. a second QoS flow is to be served by the first DRB) to include SDPA header in UL SDAP PDUs and there is no DRB configured with presence of SDAP header, the gNB may establish a second DRB with presence of SDAP header. And the gNB could (re-)configure the UE to use the second DRB to serve the first QoS flow (and the second QoS flow).

When there is need (e.g. a second QoS flow is to be served by the first DRB) to include SDPA header in UL SDAP PDU and there is a second DRB configured with presence of SDAP header, the gNB could (re-)configure the UE to use the second DRB to serve the first QoS flow (and the second QoS flow).

With this alternative, the UE could consider SDAP PDU including SDAP header in a DL PDCP PDU received on the second DRB when performing RoHC decompression for the DL PDCP PDU, and the gNB could consider SDAP PDU including SDAP header in a UL PDCP PDU received on the second DRB when performing RoHC decompression for the UL PDCP PDU.

Alternative 4: Reassembling SDAP PDU Upon Change of Presence of SDAP Header—

The UE may use a DRB to serve a QoS flow. The UE may buffer (or store) at least a PDCP SDU (or a PDCP PDU) in PDCP transmission buffer (for a PDCP entity associated with the DRB). The PDCP SDU may include a SDAP PDU.

In one embodiment, the SDAP PDU could include a SDAP header indicating the QoS flow and a SDAP SDU from the QoS flow. When no presence of SDAP header is needed on the DRB, the UE could reassemble or retrieve the PDCP SDU as no SDAP header included. For example, the UE may remove the SDAP header from the SDAP PDU, and then replace the PDCP SDU originally stored in the PDCP transmission buffer with the reassembled or retrieved PDCP SDU.

In one embodiment, the SDAP PDU could include a SDAP SDU from the QoS flow but not include SDAP header. When presence of SDAP header is needed on the DRB, the UE could reassemble/retrieve the PDCP SDU as SDAP header included. For example, the UE may add a SDAP header to the SDAP PDU, and then replace the PDCP SDU originally stored in the PDCP transmission buffer with the reassembled/retrieved PDCP SDU.

In one embodiment, the UE could not change the sequence number of the reassembled/retrieved PDCP SDU. Furthermore, the UE could not stop or restart discardTimer (discussed in 3GPP TS 38.323) associated with the reassembled/retrieved PDCP SDU.

Alternative 5: RoHC Decompression in Operation of Two Cases (SDAP Header is Present and not Present)—

In one embodiment, the UE and/or the gNB could first perform RoHC decompression taking presence of SDAP header into account (if presence of SDAP header is configured currently), and then could perform RoHC decompression taking no presence of SDAP header into account if RoHC decompression in first time fails.

In one embodiment, the UE and/or the gNB could first perform RoHC decompression taking no presence of SDAP header into account (if no presence of SDAP header is configured currently), and could then perform RoHC decompression taking presence of SDAP header into account if RoHC decompression in first time fails.

Figure 8:
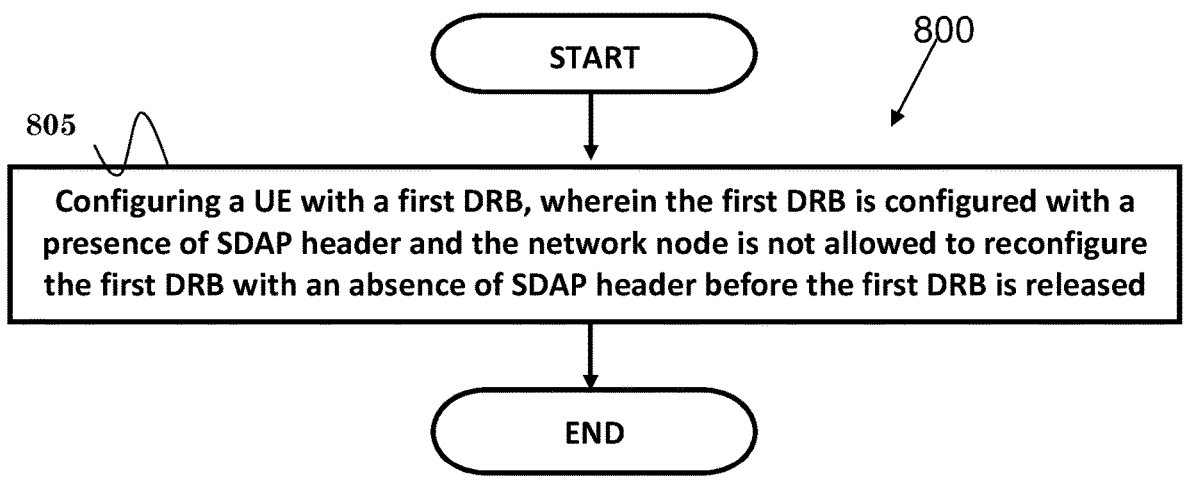
FIG. 8 is a flow chart according to one exemplary embodiment.

FIG. 8 is a flow chart 800 according to one exemplary embodiment from the perspective of a network node. In step 805, the network node configures a UE with a first DRB, wherein the first DRB is configured with a presence of SDAP header and the network node is not allowed to reconfigure the first DRB with an absence of SDAP header before the first DRB is released.

In one embodiment, the network node could configure the UE to serve a first QoS (Quality of Service) flow and a second QoS flow by the first DRB.

In one embodiment, the network node could re-configure the UE to serve a first QoS flow by a second DRB, which was originally served by the first DRB, if a second QoS flow is released or removed from the first DRB, wherein the second DRB is configured with an absence of SDAP header.

In one embodiment, the network node could establish the first DRB on the UE before configuring the UE to serve a first QoS flow and a second QoS flow by the first DRB. The network node could also establish the second DRB on the UE before re-configuring the UE to serve a first QoS flow by the second DRB.

In one embodiment, the network node may not be allowed to reconfigure the second DRB with a presence of SDAP header before the second DRB is released.

In one embodiment, the SDAP header could be a UL (Uplink) SDAP header or a DL (Downlink) SDAP header.

In one embodiment, the network node could be a base station or a gNB.

Referring back to FIGS. 3 and 4, in one exemplary embodiment of a network node, the device 300 includes a program code 312 stored in the memory 310. The CPU 308 could execute program code 312 to enable the network node to configure a UE with a first DRB, wherein the first DRB is configured with a presence of SDAP header and the network node is not allowed to reconfigure the first DRB with an absence of SDAP header before the first DRB is released. Furthermore, the CPU 308 can execute the program code 312 to perform all of the above-described actions and steps or others described herein.

Figure 9:
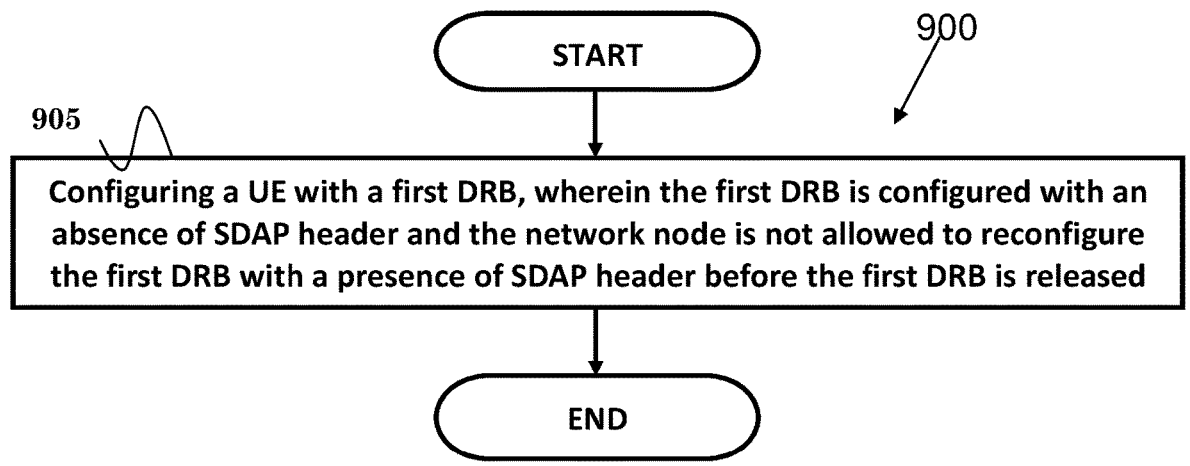
FIG. 9 is a flow chart according to one exemplary embodiment.

FIG. 9 is a flow chart 900 according to one exemplary embodiment of a network node. In step 905, the network node configures a UE with a first DRB, wherein the first DRB is configured with an absence of SDAP header and the network node is not allowed to reconfigure the first DRB with a presence of SDAP header before the first DRB is released.

In one embodiment, the network could configure the UE to serve a first QoS (Quality of Service) flow by the first DRB.

In one embodiment, the network node could re-configure the UE to serve a first QoS flow by a second DRB, which was originally served by the first DRB, if the network node determines to use the same DRB to serve the first QoS flow and a second QoS flow, wherein the second DRB is configured with a presence of SDAP header.

In one embodiment, the network node could establish the first DRB on the UE before configuring the UE to serve a first QoS flow by the first DRB. The network node could also establish the second DRB on the UE before re-configuring the UE to serve the first QoS flow and the second QoS flow by the second DRB.

In one embodiment, the second QoS flow is added or initiated on the UE before re-configuring the UE to serve the first QoS flow and the second QoS flow by the second DRB.

In one embodiment, the network node may not be allowed to reconfigure the second DRB with an absence of SDAP header before the second DRB is released.

In one embodiment, the SDAP header could be a UL (Uplink) SDAP header or a DL (Downlink) SDAP header.

In one embodiment, the network node could be a base station or a gNB.

Referring back to FIGS. 3 and 4, in one exemplary embodiment of a network node, the device 300 includes a program code 312 stored in the memory 310. The CPU 308 could execute program code 312 to enable the network node to configure a UE with a first DRB, wherein the first DRB is configured with an absence of SDAP header and the network node is not allowed to reconfigure the first DRB with a presence of SDAP header before the first DRB is released. Furthermore, the CPU 308 can execute the program code 312 to perform all of the above-described actions and steps or others described herein.

Figure 10:
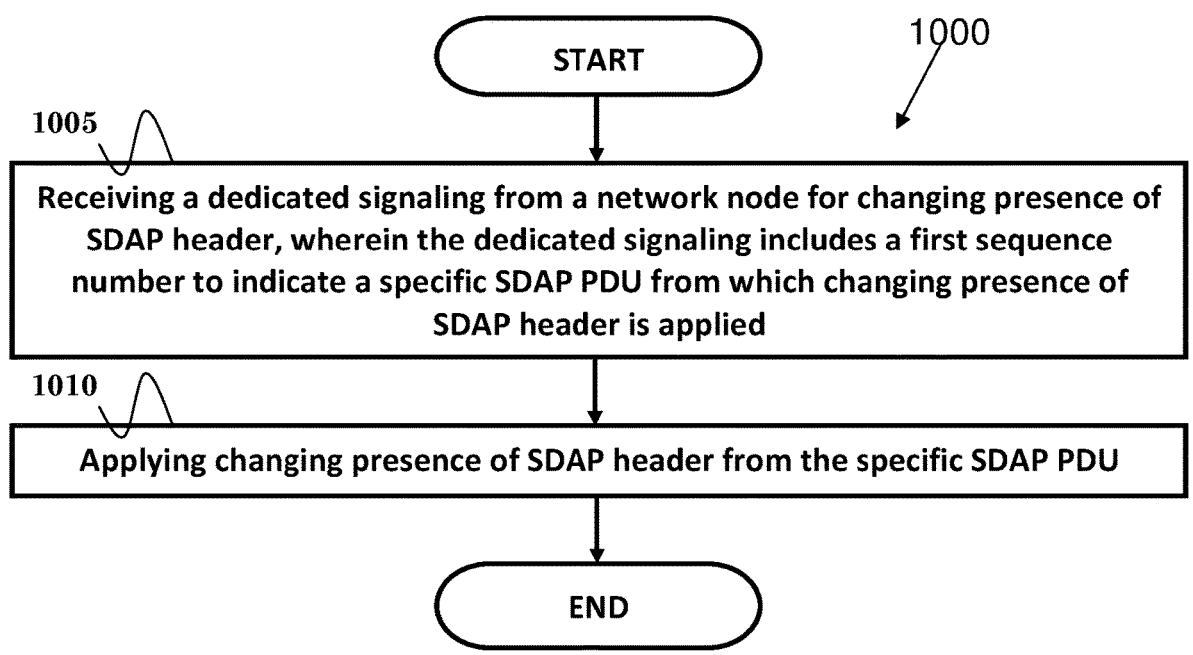
FIG. 10 is a flow chart according to one exemplary embodiment.

FIG. 10 is a flow chart 1000 according to one exemplary embodiment of a UE. In step 1005, the UE receives a dedicated signaling from a network node for changing presence of SDAP header, wherein the dedicated signaling includes a first sequence number to indicate a specific SDAP PDU from which changing presence of SDAP header is applied. In step 1010, the UE applies changing presence of SDAP header from the specific SDAP PDU.

In one embodiment, the specific SDAP PDU could be included in an UL PDCP SDU associated with the first sequence number, or a DL PDCP SDU associated with the first sequence number. Furthermore, the specific SDAP PDU could be an UL SDAP PDU associated with the first sequence number, or a DL SDAP PDU associated with the first sequence number.

In one embodiment, the UE could establish a PDU session and a first QoS flow belonging to the PDU session. The UE could also establish a second QoS flow belonging to the PDU session. Furthermore, the UE could establish a first radio bearer between the UE and the network node. In addition, the UE could establish a second radio bearer between the UE and the network node.

In one embodiment, the first QoS flow could be served by the first radio bearer. Furthermore, the second QoS flow could be served by the first radio bearer after reception of the dedicated signalling, and could be served by the second radio bearer before reception of the dedicated signalling. Also, the second QoS flow could be served by the second radio bearer after reception of the dedicated signalling, and could be served by the first radio bearer before reception of the dedicated signalling.

In one embodiment, the UE may not include a SDAP header in UL SDAP PDUs with sequence numbers less than the first sequence number and includes SDAP header in UL SDAP PDUs with sequence numbers equal to or greater than the first sequence number if the dedicated signalling indicates the UE to apply presence of SDAP header from the UL SDAP PDU associated with the first sequence number. Alternatively, the UE could include a SDAP header in UL SDAP PDUs with sequence numbers less than the first sequence number and does not include SDAP header in UL SDAP PDUs with sequence numbers equal to or greater than the first sequence number if the dedicated signalling indicates the UE to apply no presence of SDAP header from the UL SDAP PDU associated with the first sequence number.

In one embodiment, the sequence number could be a PDCP SN or a COUNT value (as discussed in 3GPP TS 38.323). The network node could be a base station or a gNB. The changing presence of SDAP header from the specific SDAP PDU could be applied on the first radio bearer. The first radio bearer could be a default radio bearer associated with the PDU session or is a non-default radio bearer associated with the PDU session.

Referring back to FIGS. 3 and 4, in one exemplary embodiment of a UE, the device 300 includes a program code 312 stored in the memory 310. The CPU 308 could execute program code 312 to enable the UE (i) to receive a dedicated signaling from a network node for changing presence of SDAP header, wherein the dedicated signaling includes a first sequence number to indicate a specific SDAP PDU from which changing presence of SDAP header is applied, and (ii) to apply changing presence of SDAP header from the specific SDAP PDU. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a network node, comprising:
   providing a first configuration of a first DRB (Data Radio Bearer) for establishing the first DRB to a UE (User Equipment),
   wherein the first configuration of the first DRB includes a second parameter indicating a presence of SDAP (Service Data Adaptation Protocol) header, and after the first DRB is established, providing a second configuration of the first DRB for modifying the first DRB to the UE, wherein the second configuration of the first DRB includes the second parameter, and the network node is forbidden to change the second parameter in the second configuration of the first DRB.

2. The method of claim 1, wherein the first configuration of the first DRB and the second configuration of the first DRB include a first parameter indicating a first QoS flow-to-DRB mapping, wherein the first QoS flow-to-DRB mapping indicates that a first QoS flow and a second QoS flow are mapped to the first DRB, and wherein the network node is allowed to change the first parameter in the second configuration of the first DRB.

3. The method of claim 2, further comprising:
releasing the first QoS flow.

4. The method of claim 3, further comprising:
providing a configuration of a second DRB to the UE, wherein the configuration of the second DRB includes a third parameter indicating an absence of SDAP header and a fourth parameter indicating a second QoS flow-to-DRB mapping.

5. The method of claim 4, wherein the second QoS flow-to-DRB mapping indicates that the second QoS flow is mapped to the second DRB.

6. The method of claim 3, further comprising:
providing first information to the UE for release of the first QoS flow.

7. The method of claim 4, wherein the configuration of the second DRB is provided to the UE in response to the release of the first QoS flow.

8. The method of claim 3, further comprising:
providing second information to the UE in response to the release of the first QoS flow, wherein the second information indicates a release of the first DRB.

9. The method of claim 1, wherein the network node is a base station or a gNB.

10. A method of a network node, comprising:
providing a first configuration of a first DRB (Data Radio Bearer) for establishing the first DRB to a UE (User Equipment),
wherein the first configuration of the first DRB includes a second parameter indicating an absence of SDAP (Service Data Adaptation Protocol) header, and
after the first DRB is established, providing a second configuration of the first DRB for modifying the first DRB to the UE,
wherein the second configuration of the first DRB includes the second parameter, and the network node is forbidden to change the second parameter in the second configuration of the first DRB.

11. The method of claim 10, wherein the first configuration of the first DRB and the second configuration of the first DRB include a first parameter indicating a first QoS flow-to-DRB mapping, wherein the first QoS flow-to-DRB mapping indicates that a first QoS flow is mapped to the first DRB, and wherein the network node is allowed to change the first parameter in the second configuration of the first DRB.

12. The method of claim 11, further comprising:
establishing a second QoS flow.

13. The method of claim 12, further comprising:
providing a configuration of a second DRB to the UE, wherein the configuration of the second DRB includes a third parameter indicating a presence of SDAP header and a fourth parameter indicating a second QoS flow-to-DRB mapping.

14. The method of claim 13, wherein the second QoS flow-to-DRB mapping indicates that the first QoS flow and the second QoS flow are mapped to the second DRB.

15. The method of claim 13, wherein the configuration of the second DRB is provided to the UE in response to the establishment of the second QoS flow.

16. The method of claim 12, further comprising:
providing second information to the UE in response to the establishment of the second QoS flow, wherein the second information indicates a release of the first DRB.

17. The method of claim 10, wherein the network node is a base station or a gNB.

18. A network node comprising:
a control circuit;
a processor installed in the control circuit; and
a memory installed in the control circuit and coupled to the processor;
wherein the processor is configured to execute a program code stored in the memory to:
provide a first configuration of a first DRB (Data Radio Bearer) for establishing the first DRB to a UE (User Equipment),
wherein the first configuration of the first DRB includes a second parameter indicating a presence of SDAP (Service Data Adaptation Protocol) header, and
after the first DRB is established, provide a second configuration of the first DRB for modifying the first DRB to the UE,
wherein the second configuration of the first DRB includes the second parameter, and the network node is forbidden to change the second parameter in the second configuration of the first DRB.

19. A network node comprising:
a control circuit;
a processor installed in the control circuit; and
a memory installed in the control circuit and coupled to the processor;
wherein the processor is configured to execute a program code stored in the memory to:
provide a first configuration of a first DRB (Data Radio Bearer) for establishing the first DRB to a UE (User Equipment),
wherein the first configuration of the first DRB includes a second parameter indicating an absence of SDAP (Service Data Adaptation Protocol) header, and
after the first DRB is established, provide a second configuration of the first DRB for modifying the first DRB to the UE,
wherein the second configuration of the first DRB includes the second parameter, and the network node is forbidden to change the second parameter in the second configuration of the first DRB.

20. The network node of claim 19, wherein the network node is a base station or a gNB.

* * * * *